(12) United States Patent
Choi et al.

(10) Patent No.: US 8,576,244 B2
(45) Date of Patent: Nov. 5, 2013

(54) VIDEO SIGNAL GENERATION APPARATUS AND METHOD MINIMIZING CROSSTALK BETWEEN LUMINANCE SIGNAL AND COLOR DIFFERENCE SIGNAL

(75) Inventors: Seo Young Choi, Seoul (KR); Ho Young Lee, Suwon-si (KR); Yun-Tae Kim, Suwon-si (KR); Du-Sik Park, Suwon-si (KR); Ji Young Hong, Seongnam-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 501 days.

(21) Appl. No.: 12/887,309

(22) Filed: Sep. 21, 2010

(65) Prior Publication Data

US 2011/0069228 A1 Mar. 24, 2011

(30) Foreign Application Priority Data

Sep. 22, 2009 (KR) .................. 10-2009-0089363
Aug. 6, 2010 (KR) .................. 10-2010-0076010

(51) Int. Cl.
| | |
|---|---|
| *H04N 9/69* | (2006.01) |
| *H04N 9/73* | (2006.01) |
| *H04N 9/77* | (2006.01) |
| *H04N 11/22* | (2006.01) |
| *G09G 5/00* | (2006.01) |
| *G09G 5/02* | (2006.01) |
| *G06K 9/00* | (2006.01) |
| *G06K 9/54* | (2006.01) |
| *G06K 9/40* | (2006.01) |
| *G06K 9/36* | (2006.01) |

(52) U.S. Cl.
USPC ........... 345/591; 345/589; 345/606; 345/604; 345/600; 345/690; 345/557; 345/571; 345/612; 345/663; 345/708; 358/515; 358/518; 358/520; 358/525; 382/166; 382/167; 382/254; 382/274; 382/276

(58) Field of Classification Search
USPC ......... 345/581, 589–591, 427–428, 600–606, 345/204, 690; 348/179, 253–256, 453–455, 348/552, 557, 571, 575, 577, 599, 612, 630, 348/645, 663, 686, 687, 708; 358/515–525, 358/448, 461; 382/162, 166–167, 232, 254, 382/274, 276, 300
See application file for complete search history.

(56) References Cited

U.S. PATENT DOCUMENTS

| | | | | |
|---|---|---|---|---|
| 5,504,821 | A | * | 4/1996 | Kanamori et al. ............ 382/167 |
| 5,543,820 | A | * | 8/1996 | Edgar .......................... 345/589 |
| 2002/0122019 | A1 | * | 9/2002 | Baba et al. ..................... 345/88 |

(Continued)

FOREIGN PATENT DOCUMENTS

| | | |
|---|---|---|
| EP | 2046067 | 4/2009 |
| JP | 2002-335541 | 11/2002 |

(Continued)

OTHER PUBLICATIONS

Written Opinion of the International Searching Authority, mailed Jun. 15, 2011, in corresponding International Application No. PCT/KR2010/006471 (7 pp.).

*Primary Examiner* — Wesner Sajous
(74) *Attorney, Agent, or Firm* — Staas & Halsey LLP

(57) ABSTRACT

Provided is a video signal generation apparatus and method that may minimize crosstalk between a luminance signal and color difference signals. The video signal generation apparatus may generate the luminance signal using a nonlinear Y signal and then generate color difference signals using a nonlinear XYZ signal to maximize a de-correlation characteristic between the luminance signal and the color difference signals.

34 Claims, 17 Drawing Sheets

(56) References Cited

U.S. PATENT DOCUMENTS

| | | | |
|---|---|---|---|
| 2006/0066546 | A1 | 3/2006 | Miyasaka |
| 2007/0070085 | A1 | 3/2007 | Yamagata et al. |
| 2007/0091213 | A1* | 4/2007 | Jaspers .................. 348/687 |

FOREIGN PATENT DOCUMENTS

| | | |
|---|---|---|
| JP | 2004-7167 | 1/2004 |
| KR | 10-0190040 | 1/1999 |
| KR | 10-0392369 | 7/2003 |
| KR | 10-0406535 | 11/2003 |
| KR | 2003-0090143 | 11/2003 |
| KR | 10-2004-0046876 | 6/2004 |
| KR | 10-2005-0111266 | 11/2005 |
| KR | 10-2006-0070009 | 6/2006 |
| KR | 10-0710302 | 4/2007 |
| KR | 10-2008-0025593 | 3/2008 |
| KR | 10-0871686 | 11/2008 |
| KR | 10-2010-0053558 | 5/2010 |

* cited by examiner

| 48 | 45 | 23 | 7 |
|----|----|----|---|
| 46 | 41 | 17 | 6 |

720

| 47 | 44 | 23 | 9 |
|----|----|----|---|
| 45 | 41 | 18 | 8 |

FIG. 15
1510 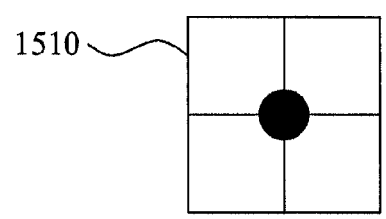
1520 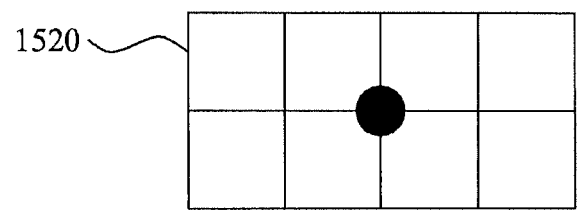
1530 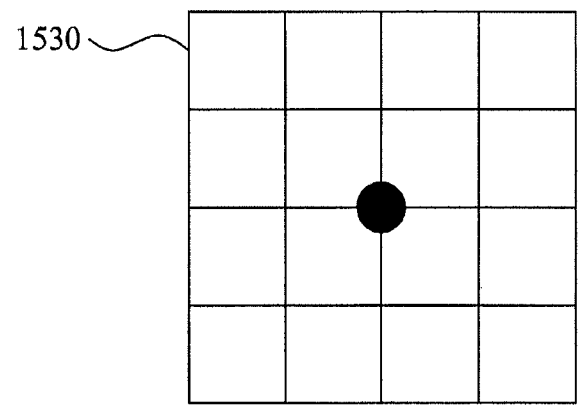

VIDEO SIGNAL GENERATION APPARATUS AND METHOD MINIMIZING CROSSTALK BETWEEN LUMINANCE SIGNAL AND COLOR DIFFERENCE SIGNAL

CROSS-REFERENCE TO RELATED APPLICATIONS

This application claims the priority benefit of Korean Patent Application No. 10-2009-0089363, filed on Sep. 22, 2009, and Korean Patent Application No. 10-2010-0076010, filed on Aug. 6, 2010, in the Korean Intellectual Property Office, the disclosures of which are incorporated herein by reference.

BACKGROUND

1. Field

Example embodiments relate to an apparatus and method of generating a video signal that may maintain a luminance signal regardless of a change in a color difference signal.

2. Description of the Related Art

A luminance signal denotes a signal indicating a luminance of an achromatic component, and a color difference signal denotes a signal indicating a relative quantity of a Yellow-Blue Chromatic component and a signal indicating a relative quantity of a Red-Green Chromatic component. When the luminance signal includes color difference information and the color difference signal includes luminance information, crosstalk may exist between the color difference signal and the luminance signal. The crosstalk may exist between the color difference signal and the luminance signal generated according to a scheme defined in an existing standard, for example, International Telecommunication Union (ITU)-R BT. 709. Causes of the crosstalk may be as follows:

First, regardless that a brightness mixture ratio of red, green, blue (RGB) primary colors used to form white of a particular color temperature may need to be applied to a linear RGB signal, the brightness mixture ratio is applied to a nonlinear RGB signal. A luminance signal is generated based on a sum of generated nonlinear RGB signal. Accordingly, the crosstalk may exist between the color difference signal and the luminance signal.

Next, since the color difference signal is generated based on a difference between the nonlinear RGB signal and the luminance signal generated based on the sum of nonlinear RGB signal, the crosstalk may exist between the color difference signal and the luminance signal.

Accordingly, two colors having the same brightness may have different luminance signals. A brightness and a luminance signal difference may have a dependent characteristic depending on colors.

SUMMARY

The foregoing and/or other aspects are achieved by providing an apparatus generating a video signal, including a luminance signal generator to generate a luminance signal A using one of a nonlinear Y signal and a sum of a nonlinear XYZ signal and a color difference signal generator to generate a color difference signal from the nonlinear XYZ signal to maximize a de-correlation characteristic in combinations of the luminance signal A and a Yellow-Blue color difference signal $C_{YB}$, of the luminance signal A and a Red-Green color difference signal $C_{RG}$, and of the Yellow-Blue color difference signal $C_{YB}$ and the Red-Green color difference signal $C_{RG}$.

The foregoing and/or other aspects are achieved by providing a method of generating a video signal, including generating, by at least one processing device, a luminance signal A using one of a nonlinear Y signal and a sum of a nonlinear XYZ signal and generating, by the at least one processing device, a color difference signal from the nonlinear XYZ signal to maximize a de-correlation characteristic in combinations of the luminance signal A and a Yellow-Blue color difference signal $C_{YB}$, of the luminance signal A and a Red-Green color difference signal $C_{RG}$, and of the Yellow-Blue color difference signal $C_{YB}$ and the Red-Green color difference signal $C_{RG}$.

The foregoing and/or other aspects are achieved by providing an apparatus generating a video signal, including a linear luminance signal generator to generate a linear luminance signal using linear RGB signals with respect to an input image, a luminance signal converter to convert the linear luminance signal to a nonlinear luminance signal, an RGB signal converter to convert the linear RGB signals to nonlinear RGB signals and a color difference signal generator to generate a color difference signal using one of the linear luminance signal and the nonlinear luminance signal, and at least two signals from one of the linear RGB signals and the nonlinear RGB signals.

The foregoing and/or other aspects are achieved by providing an apparatus processing a video signal, including a luminance signal converter to convert a nonlinear luminance signal to a linear luminance signal, a nonlinear signal generator to generate at least two nonlinear signals from a nonlinear RGB signal using a nonlinear color difference signal, an RGB signal converter to convert the at least two nonlinear signals to at least two linear signals in linear RGB signals and a linear RGB signal generator to generate a complete set of linear RGB signals using the linear luminance signal and the at least two linear signals in the linear RGB signals.

The foregoing and/or other aspects are achieved by providing a method of generating a video signal, including generating, by at least one processing device, a linear luminance signal using linear RGB signals with respect to an input image, converting, by the at least one processing device, the linear luminance signal to a nonlinear luminance signal, converting, by the at least one processing device, the linear RGB signals to nonlinear RGB signals and generating, by the at least one processing device, a color difference signal using one luminance signal from one of the linear luminance signal and the nonlinear luminance signal, and at least two signals from one of the linear RGB signals and the nonlinear RGB signals.

The foregoing and/or other aspects are achieved by providing a method of processing a video signal, including converting, by at least one processing device, a nonlinear luminance signal to a linear luminance signal, generating, by the at least one processing device, at least two nonlinear signals from in nonlinear RGB signals using a nonlinear color difference signal, converting, by the at least one processing device, the at least two nonlinear signals to at least two linear signals in linear RGB signals, and generating, by the at least one processing device, the linear RGB signals using the linear luminance signal and the at least two linear signals in the linear RGB signals.

The example embodiments may include a video signal generation apparatus and method that may generate a video signal having a luminance signal even though a change is made to a color difference signal due to sub-sampling in order to decrease an amount of color difference information.

The example embodiments may also include a video signal generation apparatus and method that may generate a color difference signal and a luminance signal having a maximum de-correlation characteristic by separating an XYZ signal in which a visual sensitivity characteristic of a human being is reflected responsive to a long wavelength, an intermediate wavelength, and a short wavelength of a visible wavelength band.

The example embodiments may also include a video signal generation apparatus and method that may generate a luminance signal using a nonlinear Y signal and then generate a color difference signal from a nonlinear XYZ signal to maximize a de-correlation characteristic between the luminance signal and color difference signals.

According to another aspect of one or more embodiments, there is provided at least one non-transitory computer readable medium including computer readable instructions that control at least one processor to implement methods of one or more embodiments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 7 illustrates a case where there is no significant change in luminance information when changing a color difference signal using a luminance signal and the color difference signal according to example embodiments;

FIG. 15 illustrates an example of sub-sampling performed in a video signal generation apparatus according to example embodiments;

DETAILED DESCRIPTION

Figure 1:
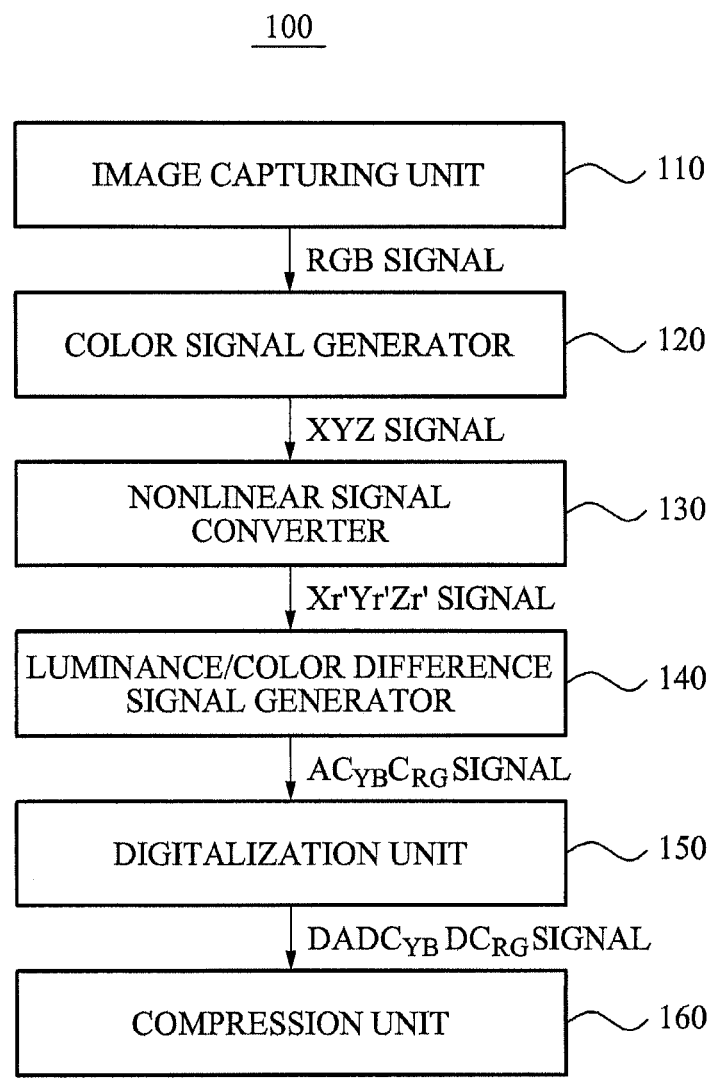
FIG. 1 illustrates an example of a video signal generation apparatus minimizing a crosstalk between a luminance signal and a color difference signal according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates an example of a video signal generation apparatus 100 minimizing crosstalk between a luminance signal and a color difference signal according to example embodiments.

Referring to FIG. 1, the video signal generation apparatus 100 may include an image capturing unit 110, a color signal generator 120, a nonlinear signal converter 130, a luminance/color difference signal generator 140, a digitalization unit 150, and a compression unit 160.

The image capturing unit 110 may capture an image and output a red, green, blue (RGB) signal with respect to the captured image.

Figure 2:
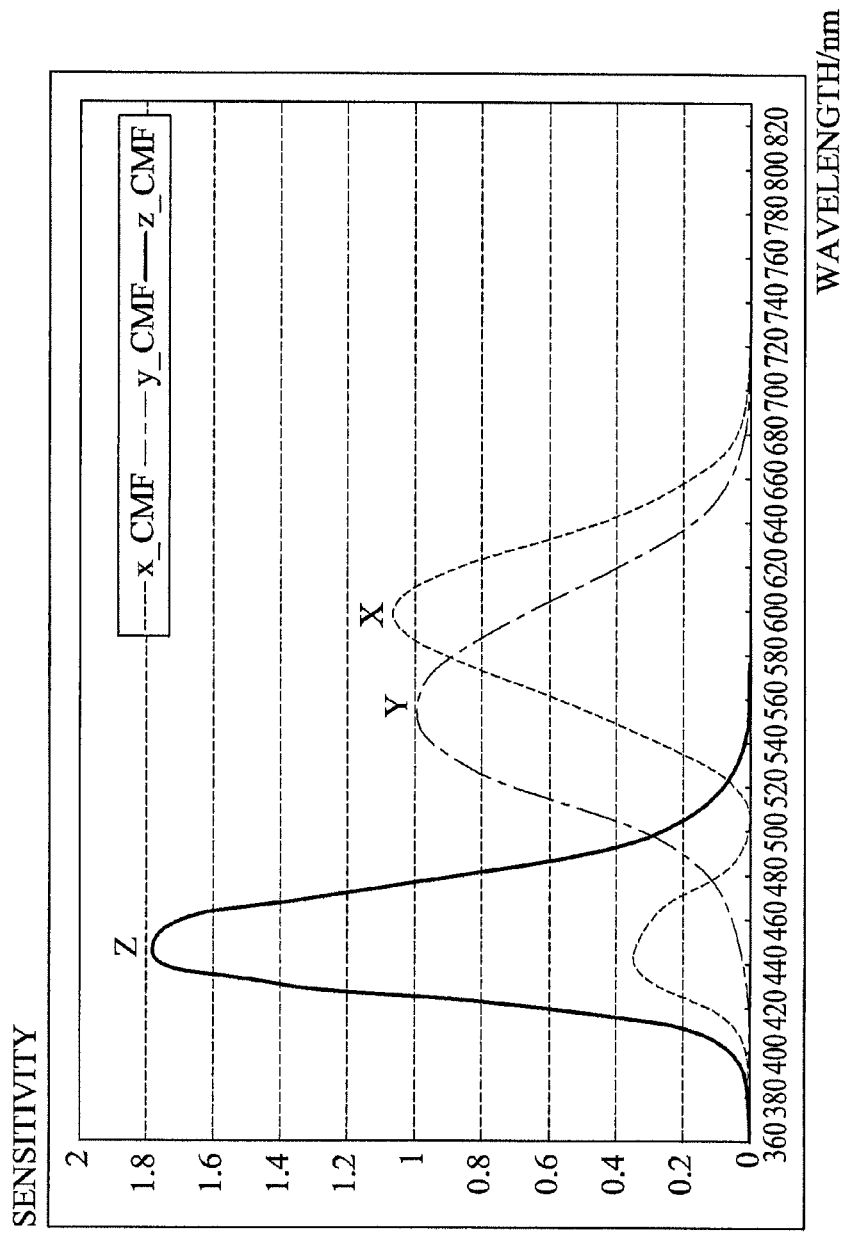
FIG. 2 illustrates an example of a color matching function according to example embodiments.

The color signal generator 120 may convert the RGB signal to an XYZ signal using a color matching function, and output a color signal converted to the XYZ signal. Specifically, the color signal generator 120 may output a tristimulus value XYZ signal calculated from the color matching function reflecting, in the RGB signal, a sensitivity characteristic of a human being with respect to a long wavelength, an intermediate wavelength, and a short wavelength. For example, as shown in FIG. 2, the color signal generator 120 may calculate the XYZ signal by differentiating the RGB signal using Commission International de l'Eclairage (CIE) 1931 color matching functions in a wavelength region.

The nonlinear signal converter 130 may convert the XYZ signal to a nonlinear XYZ signal. Specifically, the nonlinear signal converter 130 may convert the XYZ signal, which is a linear signal, to the nonlinear XYZ signal by applying a linear-to-nonlinear signal conversion function for converting the linear signal to a nonlinear signal. For example, the nonlinear signal converter 130 may convert the YZ signal to an $X_r Y_r Z_r$ signal through a normalization, and may convert the converted $X_r Y_r Z_r$ signal to the nonlinear $X_r' Y_r' Z_r'$ signal using a function as expressed by Equation 1.

$$S' = \begin{cases} 4.5S, & 0 \le S < 0.0181 \\ 1.0993 S^{0.45} - 0.0993, & 0.0181 \le S \le 1, \end{cases} \quad \text{[Equation 1]}$$

where S denotes the $X_r Y_r Z_r$ signal.

The luminance/color difference signal generator 140 may generate a luminance signal A and a color difference signal using the nonlinear XYZ signal. Specifically, the luminance/color difference signal generator 140 may generate the luminance signal A and color difference signals, for example, a Yellow-Blue color difference signal $C_{YB}$ and a Red-Green color difference signal $C_{RG}$ according to a luminance/color difference $(AC_{YB}C_{RG})$ signal generation matrix induced using the nonlinear XYZ signal, to maximize a de-correlation characteristic in combinations among the luminance signal A, the Yellow-Blue color difference signal $C_{YB}$, and the Red-Green color difference signal $C_{RG}$. Here, the Yellow-Blue color difference signal $C_{YB}$ denotes a color difference signal indicating a relative quantity between yellow and blue, and the Red-Green color difference signal $C_{RG}$ denotes a color difference signal indicating a relative quantity between red and green. For example, the luminance/color difference signal generator 140 may convert the nonlinear "$X_r'Y_r'Z_r'$" signal to the luminance signal A and the color difference signals using a matrix as expressed by Equation 2.

$$\begin{bmatrix} A \\ C_{YB} \\ C_{RG} \end{bmatrix} = \begin{bmatrix} 0.0000 & 1.0000 & 0.0000 \\ -0.1814 & -0.4143 & 0.5957 \\ 0.5357 & -0.5352 & -0.0005 \end{bmatrix} \begin{bmatrix} X_r' \\ Y_r' \\ Z_r' \end{bmatrix}$$ [Equation 2]

FIG. 2 illustrates an example of a color matching function according to example embodiments.

In color matching functions shown in FIG. 2, when an overlapping area ratio in each of X and Y, X and Z, and Y and Z among curves X, Y, and Z reflecting a sensitivity with respect to each of a long wavelength, an intermediate wavelength, and a short wavelength is calculated, XY:XZ:YZ=1: 0.3:0.2. Therefore, an XY signal pair shows a greatest overlapping area ratio.

Figure 4:
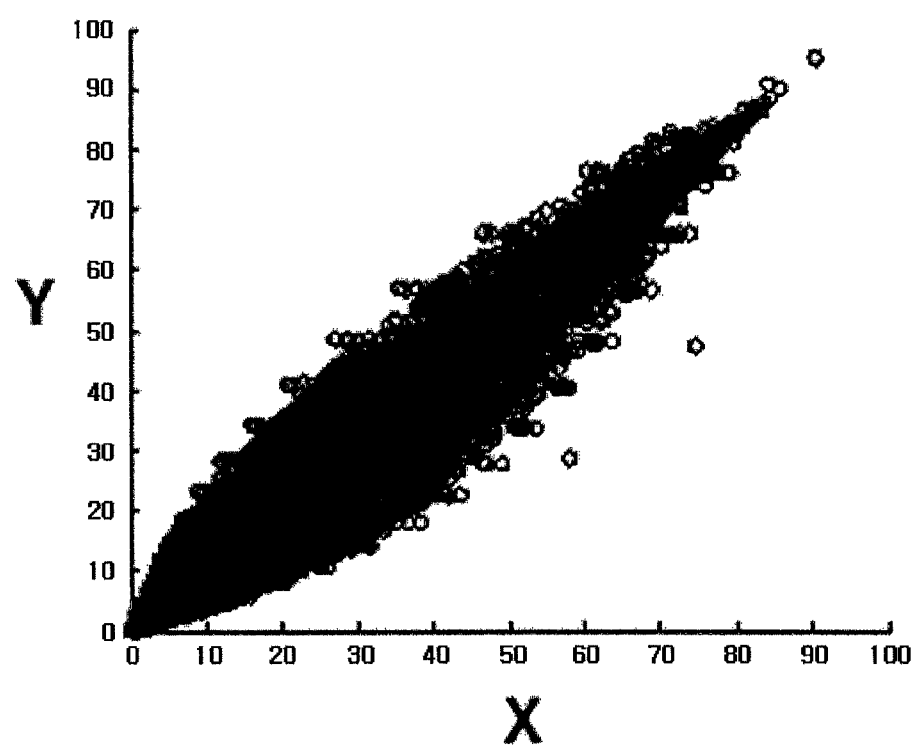
FIG. 4 illustrates a correlation between a Y signal and an X signal according to example embodiments.
Figure 5:
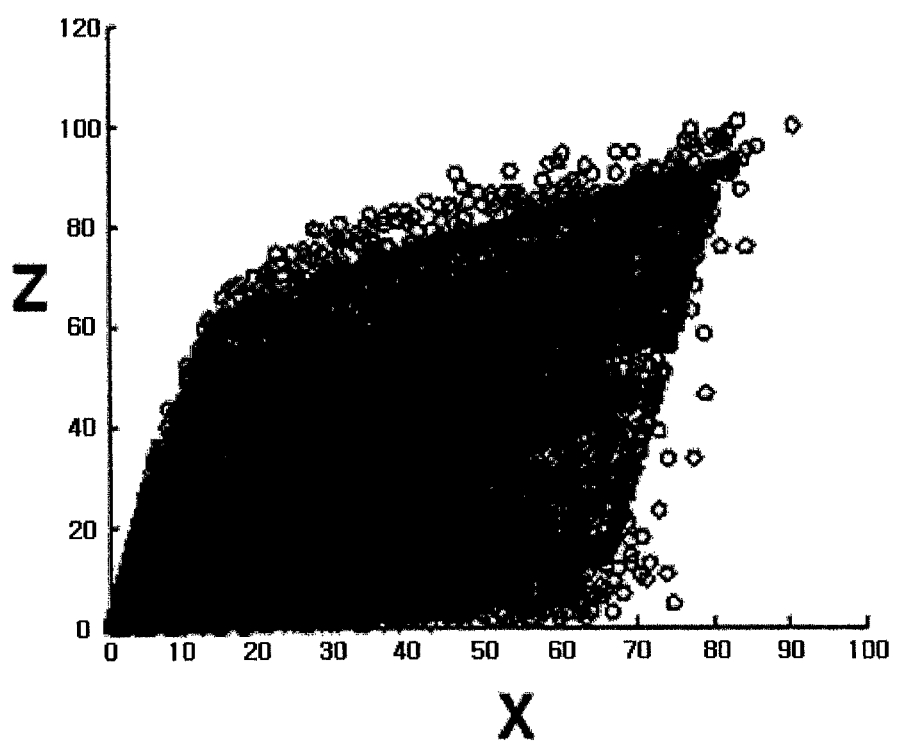
FIG. 5 illustrates a correlation between an X signal and a Z signal according to example embodiments.
Figure 6:
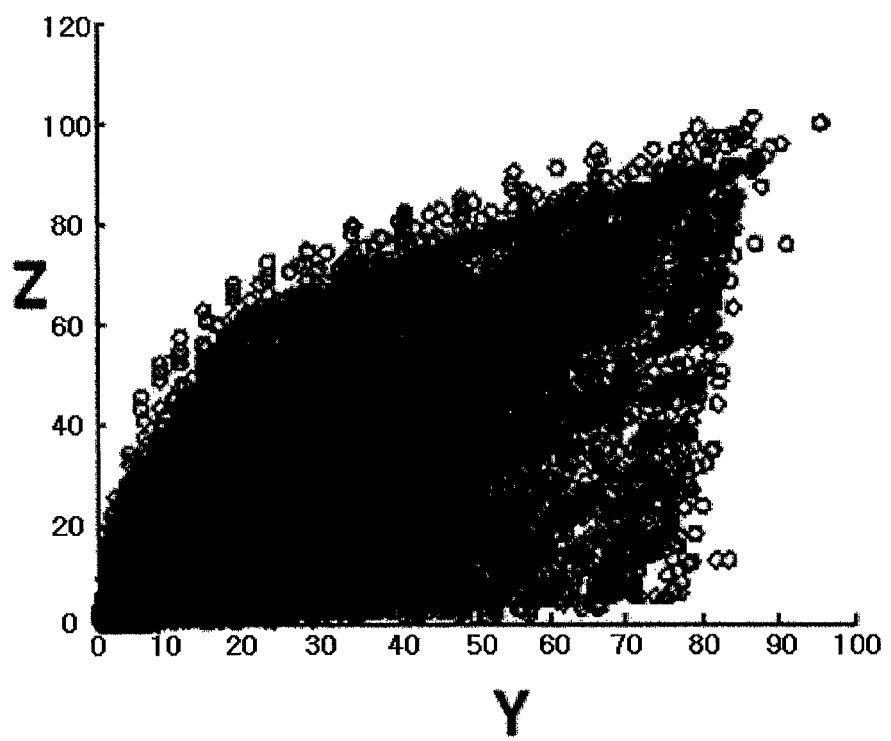
FIG. 6 illustrates a correlation between a Y signal and a Z signal according to example embodiments.

FIG. 4 illustrates a correlation between a Y signal and an X signal according to example embodiments. FIG. 5 illustrates a correlation between an X signal and a Z signal according to example embodiments. FIG. 6 illustrates a correlation between a Y signal and a Z signal according to example embodiments.

Referring to FIGS. 4 through 6, the correlation between the X signal and the Y signal is greatest, and the correlation between the Y signal and the Z signal and the correlation between the X signal and the Z signal are similar to each other. For example, a correlation coefficient between the X signal and Y signal is 0.87, a correlation coefficient between the Y signal and the Z signal is 0.50, and a correlation coefficient between the X signal and the Z signal is 0.56. Thus, the correlation between the X signal and Y signal is greatest. The above correlation characteristic may be used while separating the X signal and the Y signal, and the X signal and the Z signal to generate the Red-Green color difference signal $C_{RG}$. For example, separating the X signal and the Y signal may be given further consideration as compared with separating the X signal and the Z signal when the luminance/color difference signal generator 140 generates the Yellow-Blue color difference signal $C_{YB}$. When an absolute value of a coefficient given to a nonlinear Z signal is less than an absolute value of a coefficient given to a nonlinear X signal and a nonlinear Y signal, a de-correlation characteristic between the luminance signal A and the Red-Green color difference signal $C_{RG}$, and between the Yellow-Blue color difference signal $C_{YB}$ and the Red-Green color difference signal $C_{RG}$ may be maximized.

An operation of the luminance/color difference signal generator 140 will be further described with reference to FIG. 3.

The digitalization unit 150 may digitalize the luminance signal and the color difference signals ($DADC_{YB}DC_{RG}$), and the compression unit 160 may compress the digitalized luminance signal and the color difference signals.

Figure 3:
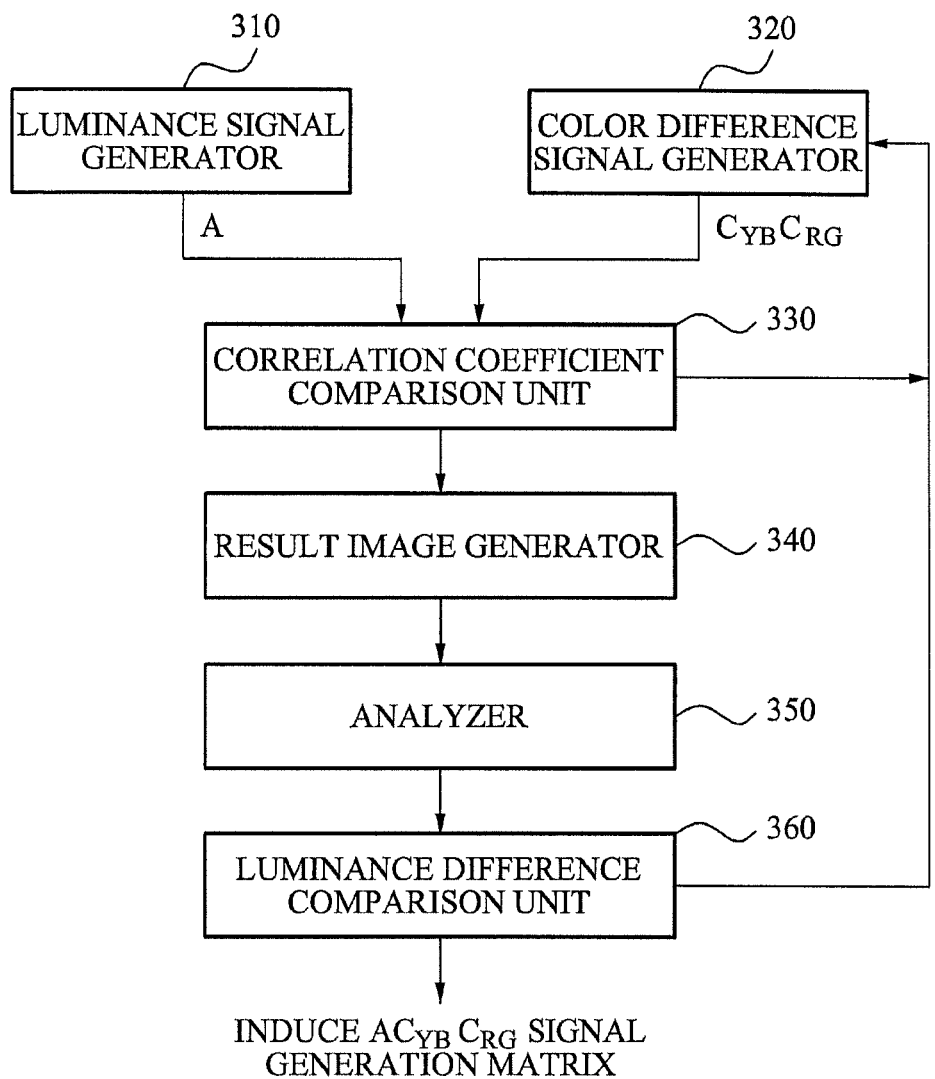
FIG. 3 illustrates a configuration of a luminance/color difference signal generator of FIG. 1.

FIG. 3 illustrates a configuration of the luminance/color difference signal generator 140 of FIG. 1.

Referring to FIG. 3, the luminance/color difference signal generator 140 may include a luminance signal generator 310, a color difference signal generator 320, a correlation coefficient comparison unit 330, a result image generator 340, an analyzer 350, and a luminance difference comparison unit 360.

The luminance signal generator 310 may generate a luminance signal A using one of a nonlinear Y signal and a sum of a nonlinear XYZ signal. For example, since a sensitivity of intermediate wavelengths forming a Y signal in the color matching functions of FIG. 2 has a similar characteristic to a photopic spectral luminous efficiency function, the luminance signal generator 310 may generate the luminance signal A which may not include color difference information using the nonlinear Y signal.

The color difference signal generator 320 may generate a color difference signal using the nonlinear XYZ signal. The color difference signal may not include luminance information. Specifically, the color difference signal generator 320 may generate a Yellow-Blue color difference signal $C_{YB}$ and a Red-Green color difference signal $C_{RG}$ from the nonlinear XYZ signal to maximize a de-correlation characteristic in combinations of a luminance signal A and the Yellow-Blue color difference signal $C_{YB}$, of the luminance signal A and the Red-Green color difference signal $C_{RG}$, and of the Yellow-Blue color difference signal $C_{YB}$ and the Red-Green color difference signal $C_{RG}$.

The color difference signal generator 320 may generate the Red-Green color difference signal $C_{RG}$ by separating an X signal and a Y signal from an XY signal pair and by separating an X signal and a Z signal from an XZ signal pair. Specifically, the color difference signal generator 320 may generate the Red-Green color difference signal $C_{RG}$, which may not include information associated with the luminance signal A and the Yellow-Blue color difference signal $C_{YB}$, by separating the X signal and the Y signal from the XY signal pair and by separating the X signal and the Z signal from the XZ signal pair.

The color difference signal generator 320 may generate the Red-Green color difference signal $C_{RG}$ from the nonlinear XYZ signal to maximize the de-correlation characteristic in the combinations of the luminance signal A and the Red-Green color difference signal $C_{RG}$ and of the Yellow-Blue color difference signal $C_{YB}$ and the Red-Green color difference signal $C_{RG}$, by forming a coefficient value given to a nonlinear X signal and a coefficient value given to a nonlinear Y(Z) signal to have an opposite sign.

The color difference signal generator 320 may generate the Yellow-Blue color difference signal $C_{YB}$ by separating an X signal and a Z signal from an XZ signal pair and by separating a Y signal and a Z signal from a YZ signal pair. Specifically, the color difference signal generator 320 may generate the Yellow-Blue color difference signal $C_{YB}$, which may not include information associated with the luminance signal A and the Red-Green color difference signal $C_{RG}$, by separating the X signal and the Z signal from the XZ signal pair and by separating the Y signal and the Z signal from the YZ signal pair.

The color difference signal generator 320 may generate the Yellow-Blue color difference signal $C_{YB}$ from the nonlinear XYZ signal to maximize the de-correlation characteristic in combinations of the luminance signal A and the Yellow-Blue color difference signal $C_{YB}$ and of the Yellow-Blue color difference signal $C_{YB}$ and the Red-Green color difference signal $C_{RG}$, by forming a coefficient value given to a nonlinear Z signal and a coefficient value given to a nonlinear X(Y) signal to have an opposite sign.

In the case of achromatic colors, the color difference signal generator 320 may generate the color difference signal to have a color difference of "0".

The correlation coefficient comparison unit 330 may compare a reference value with a correlation coefficient between the luminance signal A and the Yellow-Blue color difference signal $C_{YB}$, a correlation coefficient between the luminance signal A and the Red-Green color difference signal $C_{RG}$, and a correlation coefficient between the Yellow-Blue color difference signal $C_{YB}$ and the Red-Green color difference signal $C_{RG}$. For example, the correlation coefficient comparison unit 330 may determine whether the correlation coefficient between the luminance signal A and the Yellow-Blue color difference signal $C_{YB}$, or the correlation coefficient between the luminance signal A and the Red-Green color difference signal $C_{RG}$ is less than a first reference value, for example, 0.2, or may determine whether the correlation coefficient between the Yellow-Blue color difference signal $C_{YB}$ and the Red-Green color difference signal $C_{RG}$ is less than a second reference value, for example, 0.5. When sub-sampling the color difference signal, the luminance signal may be distorted. In this case, edge and detailed information may be lost in an image quality and thus the correlation characteristic between the luminance signal A and the color difference signals, for example, the Yellow-Blue color difference signal $C_{YB}$ and the Red-Green color difference signal $C_{RG}$ may be more importantly considered than the correlation characteristic between two color difference signals, for example, the Yellow-Blue color difference signal $C_{YB}$ and the Red-Green color difference signal $C_{RG}$.

When the correlation coefficient is greater than or equal to the reference value as a result of the comparison, the color difference signal generator 320 may regenerate the color difference signal to minimize the correlation coefficient to be less than the reference value. Specifically, the color difference signal generator 320 may generate the Yellow-Blue color difference signal $C_{YB}$ and the Red-Green color difference signal $C_{RG}$ from the nonlinear XYZ signal to minimize a correlation characteristic of between the luminance signal A and the Yellow-Blue color difference signal $C_{YB}$, between the luminance signal A and the Red-Green color difference signal $C_{RG}$, and between the Yellow-Blue color difference signal $C_{YB}$ and the Red-Green color difference signal $C_{RG}$.

The result image generator 340 may generate a result image through an inverse-conversion process after sub-sampling of a color difference signal having the correlation coefficient less than the reference value. Specifically, the result image generator 340 may generate the result image through the inverse-conversion process after sub-sampling of the color difference signal minimizing the correlation coefficient between the luminance signal A and each of the color difference signals, for example, the Yellow-Blue color difference signal $C_{YB}$ and the Red-Green color difference signal $C_{RG}$ to be less than the reference value, and maximizing the de-correlation characteristic between the luminance signal A and the color difference signals. For example, when the correlation coefficient is minimized to be less than the reference value, the result image generator 340 may perform sub-sampling of reallocating a single color difference signal to 16 pixels, and generate the result image through the inverse-conversion process of inverse-converting the luminance signal and the color difference signal to an RGB signal. In particular, the single color difference signal may be obtained by averaging the color difference signal of 16 pixels.

The analyzer 350 may analyze a luminance difference between an original image and the result image. Specifically, the analyzer 350 may analyze a difference between luminance information associated with the original image and luminance information associated with the result image.

Figure 7:
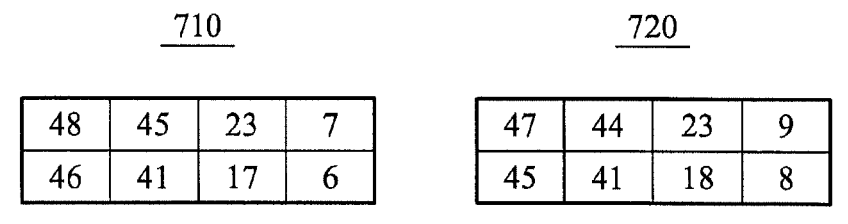

FIG. 7 illustrates a case where there is no significant change in luminance information when changing a color difference signal using a luminance signal and the color difference signal according to example embodiments.

Referring to FIG. 7, the luminance difference comparison unit 360 may compare a luminance difference between an analyzed original image and a result image based on luminance information 710 associated with the original image and luminance information 720 associated with the result image. For example, the luminance difference comparison unit 360 may determine whether the luminance difference between the original image and the result image approaches a set value, for example, "0", based on the luminance information 710 and 720. For example, when the luminance information 710 associated with the original image is "23" and the luminance information 720 associated with the result image is also "23", the comparison result value is "0". Accordingly, even though there is a change of a color difference signal with respect to the result image, the luminance difference comparison unit 360 may verify that the luminance signal is preserved.

Conversely, when the luminance difference between the original image and the result image does not approach the set value as a result of the comparison, the color difference signal generator 320 may generate color difference signals using the nonlinear signal XYZ signal, to maximize a de-correlation characteristic between the luminance signal A and the Red-Green color difference signal $C_{RG}$, and between the Yellow-Blue color difference signal $C_{YB}$ and the Red-Green color difference signal $C_{RG}$. For example, when the luminance difference between the original image and the result image does not approach the set value "0", the color difference signal generator 320 may regenerate the color difference signals using the nonlinear XYZ signal to maximize the de-correlation characteristic between the luminance signal A and the Red-Green color difference signal $C_{RG}$, and between the Yellow-Blue color difference signal $C_{YB}$ and the Red-Green color difference signal $C_{RG}$.

When the luminance difference between the original image and the result image barely exists or is minimal and a luminance of the original image is nearly similar to a luminance of the result image as the comparison result, the luminance/color difference signal generator 140 may determine a luminance/color difference signal generation matrix minimizing crosstalk between the luminance signal and the color difference signal is induced, and thereby may generate the luminance signal and the color difference signals using the induced luminance/color difference signal generation matrix. For example, when the luminance difference between the original image and the result image approaches the set value "0", the luminance/color difference signal generator 140 may determine and generate a color difference signal not including luminance information.

As described above, the luminance/color difference signal generator 140 may generate the luminance signal and the color difference signals maximizing the de-correlation characteristic between the luminance signal and the color difference signals, and having nearly no luminance difference between the original image and the result image. Accordingly, luminance information associated with the original image may barely be changed and be maintained in the result image. Since the change of the color difference signal does not affect the luminance signal, it is possible to minimize crosstalk between the luminance signal and the color difference signal.

Figure 8:
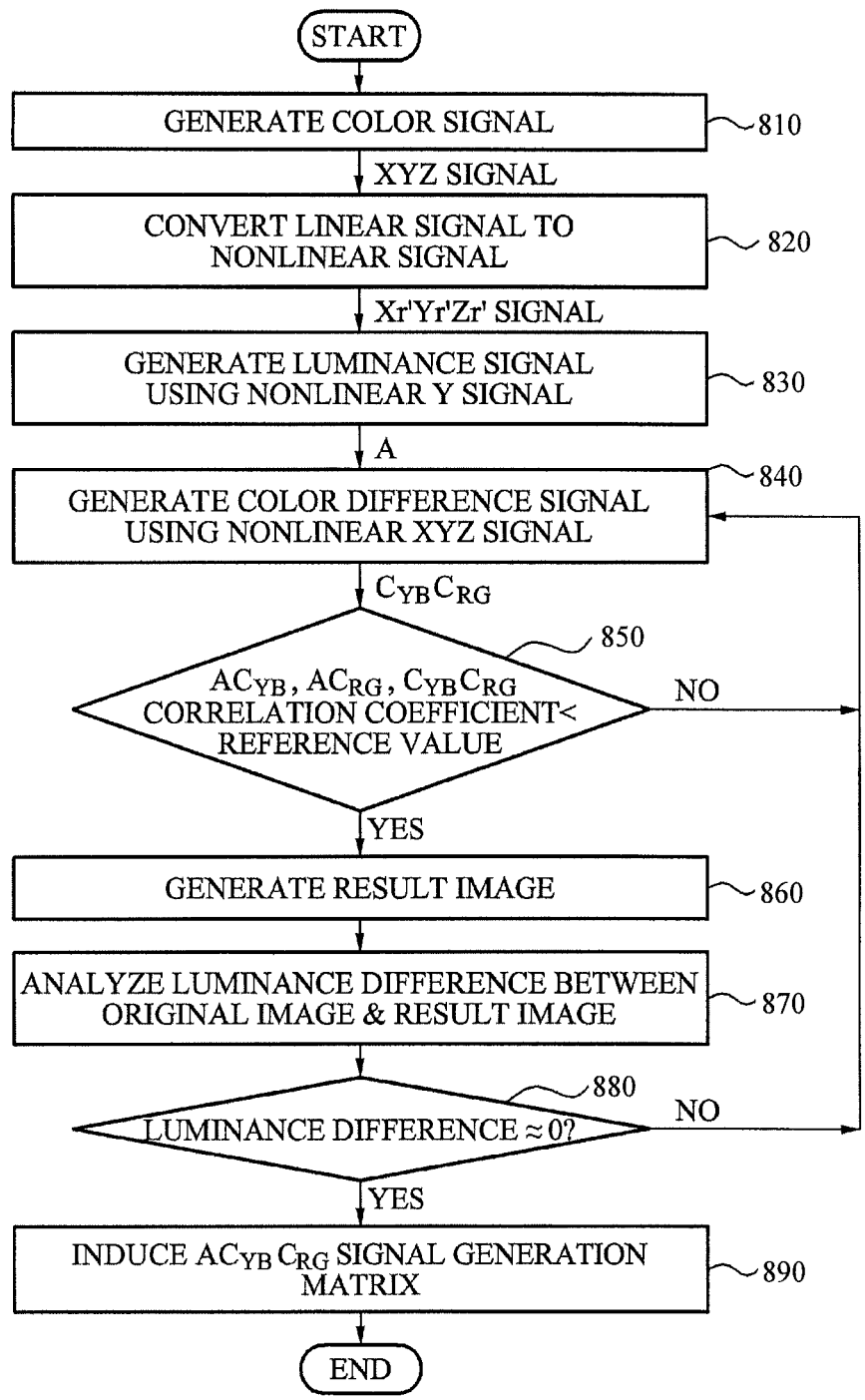
FIG. 8 illustrates a video signal generation method minimizing crosstalk between a luminance signal and a color difference signal according to example embodiments.

FIG. 8 illustrates a video signal generation method minimizing crosstalk between a luminance signal and a color difference signal according to example embodiments.

Referring to FIG. 8, in operation 810, a video signal generation apparatus may generate a color signal by converting an RGB signal of a captured image to an XYZ signal. Specifically, in operation 810, the video signal generation apparatus may generate the color signal using a tristimulus value XYZ signal calculated from a color matching function reflecting, in an RGB signal of the captured image, a sensitivity characteristic of a human being with respect to a long wavelength, an intermediate wavelength, and a short wavelength.

In operation 820, the video signal generation apparatus may convert the XYZ signal to a nonlinear XYZ signal by applying a function to convert a linear signal to a nonlinear signal.

In operation S830, the video signal generation apparatus may generate a luminance signal A using one of a nonlinear Y signal and a sum of a nonlinear XYZ signal. Specifically, since a sensitivity of intermediate wavelengths forming a Y signal in a color matching function has a similar characteristic to a photopic spectral luminous efficiency function, the video signal generation apparatus may generate the luminance signal A using the nonlinear Y signal or may generate the luminance signal A using the sum of the nonlinear XYZ signal.

In operation 840, the video signal generation apparatus may generate a color difference signal using the nonlinear XYZ signal. Specifically, in operation 840, the video signal generation apparatus may generate a Yellow-Blue color difference signal $C_{YB}$ and a Red-Green color difference signal $C_{RG}$ from the nonlinear XYZ signal to maximize a de-correlation characteristic between the luminance signal A and the Yellow-Blue color difference signal $C_{YB}$, between the luminance signal A and the Red-Green color difference signal $C_{RG}$, and between the Yellow-Blue color difference signal $C_{YB}$ and the Red-Green color difference signal $C_{RG}$.

For example, in operation 840, the video signal generation apparatus may generate the Yellow-Blue color difference signal $C_{YB}$ by separating an X signal and a Z signal from an XZ signal pair and by separating a Y signal and a Z signal from a YZ signal pair. Specifically, by maximizing the de-correlation characteristic in combinations of the luminance signal A and the Yellow-Blue color difference signal $C_{YB}$, and of the Yellow-Blue color difference signal $C_{YB}$ and the Red-Green color difference signal $C_{RG}$, the video signal generation apparatus may generate the Yellow-Blue color difference signal $C_{YB}$ which may not include information associated with the luminance signal A and the Red-Green color difference signal $C_{RG}$. To separate the X signal and the Z signal and the Y signal and the Z signal, the video signal generation apparatus may form a coefficient value of a nonlinear X(Y) signal and a coefficient value of a nonlinear Z signal to have an opposite sign and thereby maximize the de-correlation characteristic in the combinations of the Yellow-Blue color difference signal $C_{YB}$ and the luminance signal A, and of the Yellow-Blue color difference signal $C_{YB}$ and the Red-Green color difference signal $C_{RG}$. In particular, the video signal generation apparatus may maximize the de-correlation characteristic in the combinations of the Yellow-Blue color difference signal $C_{YB}$ and the luminance signal A, and of the Yellow-Blue color difference signal $C_{YB}$ and the Red-Green color difference signal $C_{RG}$ when an absolute value of a coefficient given to the nonlinear X signal is less than an absolute value of a coefficient given to the nonlinear Y signal and the nonlinear Z signal.

As another example, in operation 840, the video signal generation apparatus may generate the Red-Green color difference signal $C_{RG}$ by separating the X signal and the Y signal from the XY signal pair and by separating the X signal and the Z signal from the XZ signal pair. Specifically, in operation 840, the video signal generation apparatus may generate the Red-Green color difference signal $C_{RG}$ which may not include information associated with the luminance signal A and the Yellow-Blue color difference signal $C_{YB}$ by maximizing the de-correlation characteristic in the combinations of the Yellow-Blue color difference signal $C_{YB}$ and the luminance signal A, and of the Yellow-Blue color difference signal $C_{YB}$ and the Yellow-Blue color difference signal $C_{YB}$. To separate the X signal and the Y signal, and the X signal and the Z signal, the video signal generation apparatus may form a coefficient value of the nonlinear X signal and a coefficient value of the nonlinear Y(Z) signal to have an opposite sign and thereby maximize the de-correlation characteristic in the combinations of the Red-Green color difference signal $C_{RG}$ and the luminance signal A, and of the Red-Green color difference signal $C_{RG}$ and the Yellow-Blue color difference signal $C_{YB}$. In particular, the video signal generation apparatus may maximize the de-correlation characteristic in the combinations of the Red-Green color difference signal $C_{RG}$ and the luminance signal A, and of the Red-Green color difference signal $C_{RG}$ and the Yellow-Blue color difference signal $C_{YB}$ when an absolute value of a coefficient given to the nonlinear Z signal is less than an absolute value of a coefficient given to the nonlinear X signal and the nonlinear Y signal.

Also, in operation 840, the video signal generation apparatus may generate the color difference signal to have a color difference of "0" in the case of achromatic colors.

In operation 850, the video signal generation apparatus may compare a reference value with a correlation coefficient between the luminance signal A and the Yellow-Blue color difference signal $C_{YB}$, a correlation coefficient between the luminance signal A and the Red-Green color difference signal $C_{RG}$, or a correlation coefficient between the Yellow-Blue color difference signal $C_{YB}$ and the Red-Green color difference signal $C_{RG}$. For example, the video signal generation apparatus may determine whether the correlation coefficient between the luminance signal A and the Yellow-Blue color difference signal $C_{YB}$, or a correlation coefficient between the luminance signal A and the Red-Green color difference signal $C_{RG}$ is less than a first reference value, for example, 0.2, or may determine whether the correlation coefficient between the Yellow-Blue color difference signal $C_{YB}$ and the Red-Green color difference signal $C_{RG}$ is less than a second reference value, for example, 0.5.

When the correlation coefficient between the luminance signal A and the Yellow-Blue color difference signal $C_{YB}$, or the correlation coefficient between the luminance signal A and the Red-Green color difference signal $C_{RG}$ is greater than or equal to the reference value, the video signal generation apparatus may again perform operations after operation 840 and thereby generate, from the nonlinear XYZ signal, color difference signals minimizing a correlation characteristic between the luminance signal A and the Red-Green color difference signal $C_{RG}$, and between the Yellow-Blue color difference signal $C_{YB}$ and the Red-Green color difference signal $C_{RG}$.

In operation 860, when the correlation coefficient between the luminance signal A and the Yellow-Blue color difference signal $C_{YB}$, the correlation coefficient between the luminance signal A and the Red-Green color difference signal $C_{RG}$, and the correlation coefficient between the Yellow-Blue color difference signal $C_{YB}$ and the Red-Green color difference signal $C_{RG}$ are less than the reference value, the video signal generation apparatus may generate a result image after sub-sampling of the Yellow-Blue color difference signal $C_{YB}$ and the Red-Green color difference signal $C_{RG}$. Specifically, in operation 860, the video signal generation apparatus may generate the result image through the inverse-conversion process after sub-sampling of the color difference signal minimizing the correlation coefficient between the luminance signal A and each of the color difference signals, for example, the Yellow-Blue color difference signal $C_{YB}$ and the Red-Green color difference signal $C_{RG}$ to be less than the reference value, and maximizing the de-correlation characteristic between the luminance signal A and the color difference signals. For example, when the correlation coefficient is minimized to be less than the reference value, the video signal generation apparatus may perform sub-sampling of reallocating a single color difference signal to 16 pixels, and generate the result image through the inverse-conversion process of inverse-converting the luminance signal and the color difference signal to an RGB signal. Thus, the single color difference signal may be obtained by averaging the color difference signal of 16 pixels.

In operation 870, the video signal generation apparatus may analyze a luminance difference between an original image and the result image.

In operation 880, the video signal generation apparatus may determine whether the luminance difference approaches "0" based on the analysis result. Specifically, in operation 880, the video signal generation apparatus may determine whether the luminance difference between the original image and the result image approaches "0" based on the analysis result, and thereby determine whether a luminance value of the original image is minimal or barely changed and is maintained in the result image.

When the luminance difference does not approach "0" based on the analysis result, the video signal generation apparatus may again perform operations after operation 840 and thereby may generate, using the nonlinear signal XYZ signal, color difference signals maximizing the de-correlation characteristic between the luminance signal A and the Red-Green color difference signal $C_{RG}$, and between the Yellow-Blue color difference signal $C_{YB}$ and the Red-Green color difference signal $C_{RG}$. Specifically, when the luminance difference does not approach "0" based on the analysis result, the video signal generation apparatus may generate the Yellow-Blue color difference signal $C_{YB}$ and the Red-Green color difference signal $C_{RG}$ from the nonlinear signal XYZ signal, to minimize a correlation characteristic between the luminance signal A and the Yellow-Blue color difference signal $C_{YB}$, between the luminance signal A and the Red-Green color difference signal $C_{RG}$, and between the Yellow-Blue color difference signal $C_{YB}$ and the Red-Green color difference signal $C_{RG}$.

In operation 890, when the luminance difference approaches "0" based on the analysis result, the video signal generation apparatus may induce a luminance/color difference ($AC_{YB}C_{RG}$) signal generation matrix. Specifically, when the luminance difference approaches "0" based on the analysis result, the video signal generation apparatus may induce the luminance/color difference ($AC_{YB}C_{RG}$) signal generation matrix where a luminance signal is maintained regardless of a change in a color difference signal.

Figure 9:
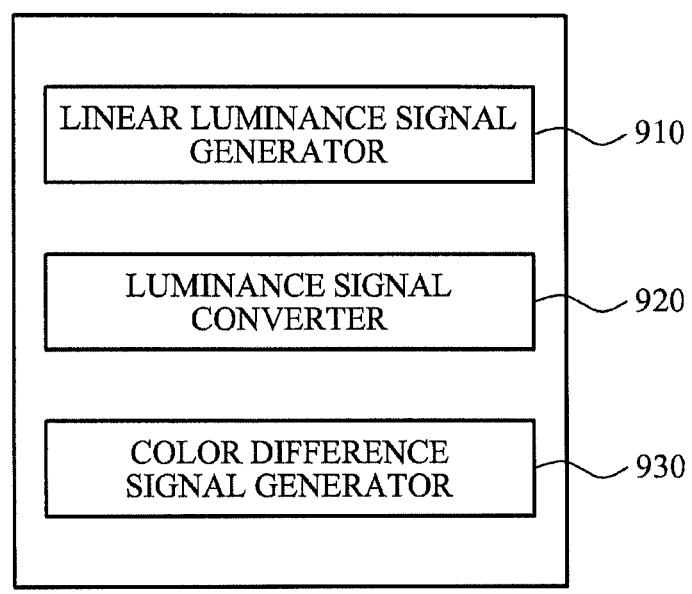
FIG. 9 illustrates a configuration of a video signal generation apparatus according to example embodiments.

FIG. 9 illustrates a configuration of a video signal generation apparatus 900 according to example embodiments. The video signal generation apparatus 900 may generate a linear luminance signal using a linear RGB signal, convert the linear luminance signal to a nonlinear luminance signal and then quantize the nonlinear luminance signal. The video signal generation apparatus 900 may use the quantized nonlinear luminance signal as a video signal. Also, the video signal generation apparatus 900 may generate a color difference signal using the nonlinear luminance signal and at least two signals of the linear RGB signal and a nonlinear RGB signal.

Referring to FIG. 9, the video signal generation apparatus 900 may include a linear luminance signal generator 910, a luminance signal converter 920, and a color difference signal generator 930.

The linear luminance signal generator 910 may generate a linear luminance signal using a linear RGB signal with respect to an input image. When generating the luminance signal, luminance information of an original input image may be maintained by generating the linear luminance signal using the linear RGB signal having a proportional relationship with a brightness indicating a physical amount of luminance information. For example, the linear luminance signal generator 910 may generate the linear luminance signal using a scheme as expressed by Equation 3.

$$A = C_1 R + C_2 G + C_3 B \quad \text{[Equation 3]}$$

Here, 'A' denotes the linear luminance signal, and 'R', 'G', and 'B' indicate a linear R signal, a linear G signal, and a linear B signal, respectively in the linear RGB signal. Also, each of '$C_1$', '$C_2$', and '$C_3$' may indicate a prime number between 0 and 1. For example, in the case of a RGB primary color defined in an ITU-R BT.709 standard and D65 white point (CIE XYZ=95.04, 100.00, 108.89), '$C_1$', '$C_2$', and '$C_3$' used as a combination ratio of the linear RGB signal may have a value of 0.2126, 0.7152, and 0.0722, respectively.

The luminance signal converter 920 may convert the linear luminance signal to a nonlinear luminance signal. Specifically, the video signal generation apparatus 900 may generate the linear luminance signal using the linear RGB signal, instead of generating the nonlinear luminance signal. The video signal generation apparatus 900 may convert the linear luminance signal to the nonlinear luminance signal and thereby use the converted nonlinear luminance signal as a video signal. As described above, by using the linear RGB signal to generate the luminance signal, luminance information of the original input image may be maintained. For example, the linear-luminance signal may be converted to the nonlinear luminance signal using a nonlinear function expressed as expressed by Equation 4.

$$A' = A^{0.5} \quad \text{[Equation 4]}$$

Here, 'A' denotes the linear luminance signal, and 'A'' denotes the nonlinear luminance signal. Hereinafter, when a symbol "'" is added to a factor indicating a linear signal, it may indicate a nonlinear signal with respect to a corresponding linear signal.

The color difference signal generator 930 may generate a color difference signal using one luminance signal of the linear luminance signal and the nonlinear luminance signal, and at least two signals of the linear RGB signal and the nonlinear RGB signal. For this, the video signal generation apparatus 900 may further include an RGB signal converter (not shown) to convert the linear RGB signal to the nonlinear RGB signal.

For example, the color difference signal generator 930 may convert, to a nonlinear GB signal, a GB signal of the linear RGB signal, and may generate a nonlinear color difference signal using the converted nonlinear GB signal and the nonlinear luminance signal. For the above operation, although not illustrated in FIG. 9, the color difference signal generator 930 may include a GB signal converter to convert, to the nonlinear GB signal, the GB signal of the linear RGB signal, and a nonlinear color difference signal generator to generate the nonlinear color difference signal using the nonlinear GB signal and the nonlinear luminance signal. In this case, the GB signal may be converted to the nonlinear GB signal using a nonlinear function as expressed by Equation 5.

$$G' = G^{0.5}$$

$$B' = B^{0.5} \quad \text{[Equation 5]}$$

The nonlinear color difference signal generator may generate a nonlinear Red-Green color difference signal $C_{RG}'$ using a nonlinear G signal and the nonlinear luminance signal, and may generate a nonlinear Yellow-Blue color difference signal $C_{YB}'$ using a nonlinear B signal and the nonlinear luminance signal. An example of generating the nonlinear Red-Green color difference signal $C_{RG}'$ and the nonlinear Yellow-Blue color difference signal $C_{YB}'$ may be expressed by Equation 6.

$$C_{YB}' = B' - A'$$

$$C_{RG}' = G' - A' \quad \text{[Equation 6]}$$

Here, '$C_{YB}$' denotes the Yellow-Blue color difference signal and the symbol "'" indicates that a corresponding factor is nonlinear. For example, '$C_{YB}'$' denotes the nonlinear Yellow-Blue color difference signal. Similarly, 'B'' denotes a nonlinear B, 'A'' denotes the nonlinear luminance signal, '$C_{RG}'$' denotes the nonlinear Red-Green color difference signal, and 'G'' denotes the nonlinear G signal.

As another example, the color difference signal generator 930 may generate the color difference signal using an RB signal of the linear RGB signal and the nonlinear color difference signal. For the above operation, although not illustrated in FIG. 9, the color difference signal generator 930 may include an RB signal converter to convert, to a nonlinear RB signal, the RB signal of the linear RGB signal, and a nonlinear color difference signal generator to generate the nonlinear color difference signal using the nonlinear RB signal and the nonlinear luminance signal. The RB signal may be converted to the nonlinear RB signal using a nonlinear function as expressed by Equation 7.

$$R' = R^{0.5}$$

$$B' = B^{0.5} \quad \text{[Equation 7]}$$

The nonlinear color difference signal generator may generate a nonlinear Red-Green color difference signal $C_{RG}'$ using a nonlinear R signal and the nonlinear luminance signal, and may generate a nonlinear Yellow-Blue color difference signal $C_{YB}'$ using a nonlinear B signal and the nonlinear luminance signal. An example of generating the nonlinear Red-Green color difference signal $C_{RG}'$ and the nonlinear Yellow-Blue color difference signal $C_{YB}'$ may be expressed by Equation 8.

$$C_{YB}' = B' - A'$$

$$C_{RG}' = R' - A' \quad \text{[Equation 8]}$$

Here, other elements will be the same as Equation 3, and 'R'' denotes the nonlinear R signal.

The aforementioned two schemes of generating the color difference signal will be further described with reference to FIG. 10 and FIG. 11.

Figure 10:
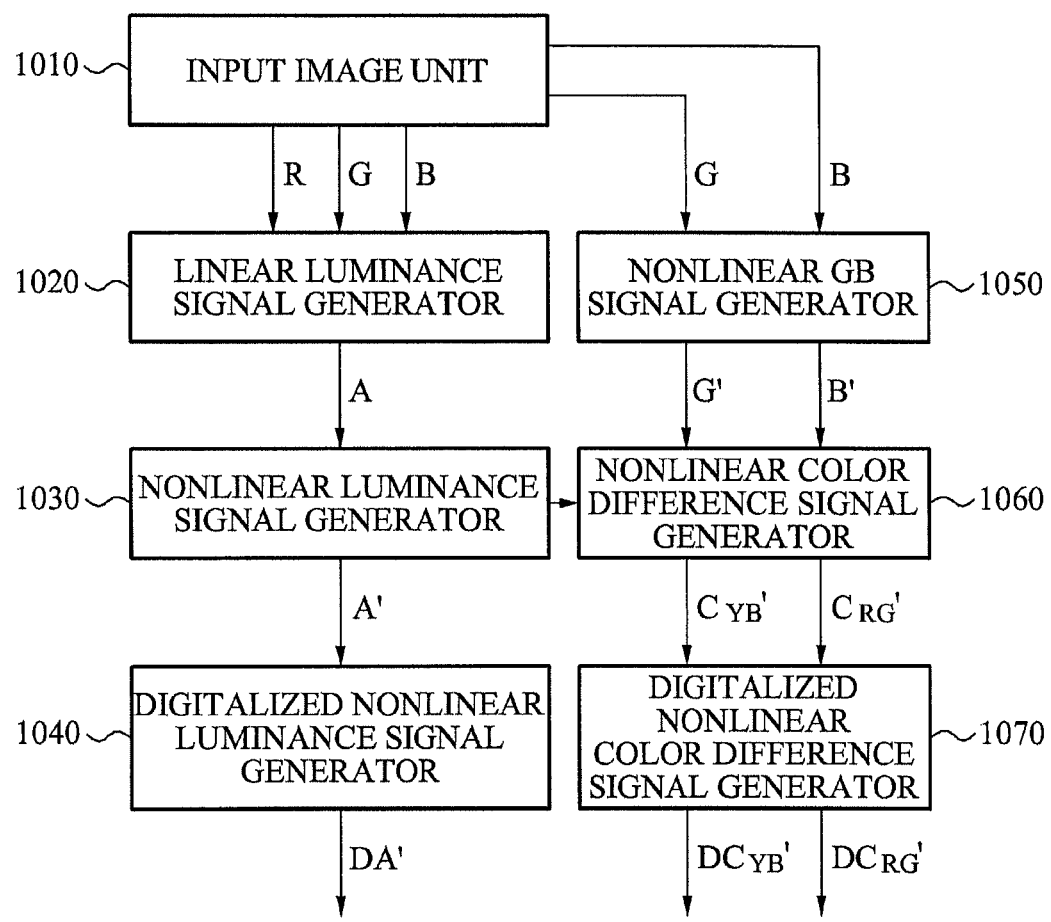
FIG. 10 illustrates a first example of generating a video signal according to example embodiments.

FIG. 10 illustrates a first example of generating a video signal according to example embodiments. FIG. 10 illustrates an input image unit 1010, a linear luminance signal generator 1020, a nonlinear luminance signal generator 1030, a digitalized nonlinear luminance signal generator 1040, a nonlinear GB signal generator 1050, a nonlinear color difference signal generator 1060, and a digitalized nonlinear color difference signal generator 1070.

Here, the linear luminance signal generator 1020 may correspond to the linear luminance signal generator 910 of FIG. 9, the nonlinear luminance signal generator 1030 may correspond to the luminance signal converter 920, and the nonlinear GB signal generator 1050 and the nonlinear color difference signal generator 1060 may correspond to the GB signal converter and the nonlinear color difference signal discussed above but not illustrated in FIG. 9.

As necessary, the input image unit 1010, the digitalized nonlinear luminance signal generator 1040, and the digitalized nonlinear color difference signal generator 1070 may be included in the video signal generation apparatus 900, or may operate in a manner to transmit and receive data to and from the video signal generation apparatus 900 outside the video signal generation apparatus 900.

The input image unit 1010 may output a linear RGB signal with respect to an input image. The linear luminance signal generator 1020 may receive the linear RGB signal from the input image unit 1010, and the nonlinear GB signal generator 1050 may receive only a linear GB signal (G, B) from the linear RGB signal.

The linear luminance signal generator 1020 may generate a linear luminance signal A using the linear RGB signal. The linear luminance signal A may be transmitted to the nonlinear luminance signal generator 1030. The nonlinear luminance signal generator 1030 may generate a nonlinear luminance signal A' by converting the linear luminance signal A.

The digitalized nonlinear luminance signal generator 1040 may generate a digitalized nonlinear luminance signal DA' by digitalizing the nonlinear luminance signal A'.

The nonlinear GB signal generator 1050 receiving the linear GB signal (G, B) may generate the nonlinear GB signal (G', B') using the linear GB signal.

The nonlinear color difference generator 1060 may generate nonlinear color difference signals, for example, $C_{YB}'$ and $C_{RG}'$, using the nonlinear luminance signal A' and the nonlinear GB signal (G', B') generated by the nonlinear GB signal generator 1050.

The digitalized nonlinear color difference signal generator 1070 may generate digitalized nonlinear color difference signals, for example, $DC_{YB}'$ and $DC_{RG}'$ by digitalizing the nonlinear color difference signals, for example, $C_{YB}'$ and $C_{RG}'$.

The digitalized nonlinear luminance signal DA' generated by the digitalized nonlinear luminance signal generator 1040 and the digitalized nonlinear color difference signals, for example, $DC_{YB}'$ and $DC_{RG}'$ generated by the digitalized nonlinear color difference signal generator 1070 may be provided, as video signals, to a terminal (not shown) and the like for displaying the input image.

Figure 11:
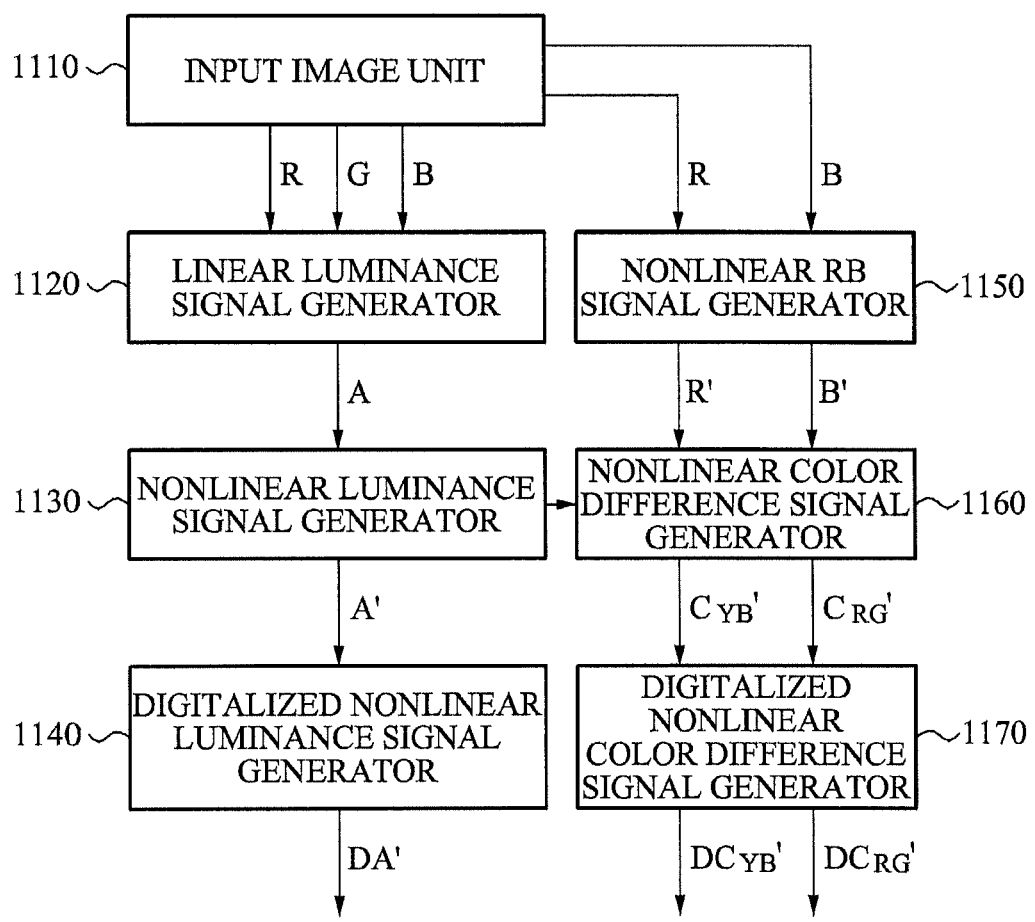
FIG. 11 illustrates a second example of generating a video signal according to example embodiments.

FIG. 11 illustrates a second example of generating a video signal according to example embodiments. FIG. 11 illustrates an input image unit 1110, a linear luminance signal generator 1120, a nonlinear luminance signal generator 1130, a digitalized nonlinear luminance signal generator 1140, a nonlinear RB signal generator 1150, a nonlinear color difference signal generator 1160, and a digitalized nonlinear color difference signal generator 1170.

The linear luminance signal generator 1120 may correspond to the linear luminance signal generator 910 of FIG. 9, the nonlinear luminance signal generator 1130 may correspond to the luminance signal converter 920, and the nonlinear RB signal generator 1150 and the nonlinear color difference signal generator 1160 may correspond to the RB signal converter and the nonlinear color difference signal discussed above but not illustrated in FIG. 9.

As necessary, the input image unit 1110, the digitalized nonlinear luminance signal generator 1140, and the digitalized nonlinear color difference signal generator 1170 may be included in the video signal generation apparatus 900, or may operate in a manner to transmit and receive data to and from the video signal generation apparatus 900 outside the video signal generation apparatus 900.

The input image unit 1110 may output a linear RGB signal with respect to an input image. The linear luminance signal generator 1120 may receive the linear RGB signal from the input image unit 1110, and the nonlinear RB signal generator 1150 may receive only a linear RB signal (R, B) from the linear RGB signal.

The linear luminance signal generator 1120 may generate a linear luminance signal A using the linear RGB signal. The linear luminance signal A may be transmitted to the nonlinear luminance signal generator 1130. The nonlinear luminance signal generator 1130 may generate a nonlinear luminance signal A' by converting the linear luminance signal A.

The digitalized nonlinear luminance signal generator 1140 may generate a digitalized nonlinear luminance signal DA' by digitalizing the nonlinear luminance signal A'.

The nonlinear RB signal generator 1150 receiving the linear RB signal (R, B) may generate the nonlinear RB signal (R', B') using the linear RB signal.

The nonlinear color difference generator 1160 may generate nonlinear color difference signals, for example, $C_{YB}'$ and $C_{RG}'$, using the nonlinear luminance signal A' and the nonlinear RB signal (R', B') generated by the nonlinear RB signal generator 1150.

The digitalized nonlinear color difference signal generator 1170 may generate digitalized nonlinear color difference signals, for example, $DC_{YB}'$ and $DC_{RG}'$ by digitalizing the nonlinear color difference signals, for example, $C_{YB}'$ and $C_{RG}'$.

The digitalized nonlinear luminance signal DA' generated by the digitalized nonlinear luminance signal generator 1140 and the digitalized nonlinear color difference signals, for example, $DC_{YB}'$ and $DC_{RG}'$ generated by the digitalized nonlinear color difference signal generator 1170 may be provided, as video signals, to a terminal (not shown) and the like to display the input image.

Referring again to FIG. 9, the video signal generation apparatus 900 may further include a sub-sampling unit (not shown) to perform sub-sampling of a color difference signal. Sub-sampling may be used to decrease an amount of information with respect to data of an input image. In the example embodiments, sub-sampling may be performed with respect to only the color difference signal. Sub-sampling will be further described with reference to FIG. 15.

The digitalization described above with reference to FIG. 10 and FIG. 11 may indicate a quantization mentioned briefly with reference to FIG. 9 above. Here, the nonlinear luminance signal A' and the nonlinear color difference signals, for example, $C_{YB}'$ and $C_{RG}'$ may be digitalized and thereby become an integer type according to a bit-depth, as given by Equation 9.

$$DA'=(219*A'+16)*2^{(n-8)}$$

$$DC_{YB}'=(224*((C_{YB}'+0.9636/1.7258-0.5)+128)*2^{(n-8)}$$

$$DC_{RG}'=(224*((C_{RG}'+0.5255/0.6794-0.5)+128)*2^{(n-8)} \quad \text{[Equation 9]}$$

Here, 'n' denotes a required bit-depth such as 8, 10, 12, and the like, and '*' denotes a multiplication. The digitalized nonlinear luminance signal DA' and the digitalized nonlinear color difference signals, for example, $DC_{YB}'$ and $DC_{RG}'$ may be converted again to the linear RGB signal through an inverse-conversion process such as an inverse-digitalization and the like, and thereby be used to generate the result image. The inverse-conversion process will be further described with reference to FIG. 12 through FIG. 14.

Figure 12:
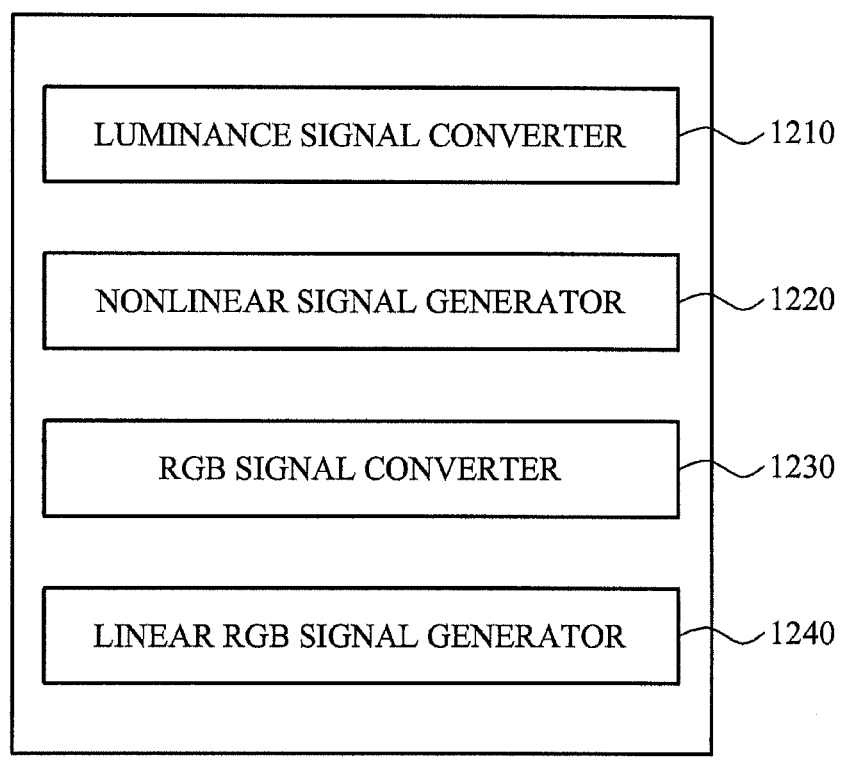
FIG. 12 illustrates a configuration of a video signal processing apparatus according to example embodiments.

FIG. 12 illustrates a configuration of a video signal processing apparatus 1200 according to example embodiments. The video signal processing apparatus 1200 may generate a result image using a nonlinear luminance signal and a nonlinear color difference signal, which is described above with reference to FIG. 9 through FIG. 11.

Referring to FIG. 12, the video signal processing apparatus 1200 may include a luminance signal converter 1210, a nonlinear signal generator 1220, an RGB signal converter 1230, and a linear RGB signal generator 1240.

The luminance signal converter 1210 may convert a nonlinear luminance signal to a linear luminance signal. The nonlinear luminance signal may correspond to the nonlinear luminance signal described above with reference to FIG. 9 through FIG. 11. For example, the luminance signal converter 1210 may convert, to the linear luminance signal, the nonlinear luminance signal generated by the video signal generation apparatus 900.

The nonlinear signal generator 1220 may generate at least two nonlinear signals from a nonlinear RGB signal using the nonlinear color difference signal and the nonlinear luminance signal. As an example, the nonlinear color difference signal may include a nonlinear Red-Green color difference signal $C_{RG}'$ that is generated using a nonlinear G signal of the nonlinear RGB signal and the nonlinear luminance signal, and a nonlinear Yellow-Blue color difference signal $C_{YB}'$ that is generated using a nonlinear B signal of the nonlinear RGB signal and the nonlinear luminance signal. As another example, the nonlinear color difference signal may include a nonlinear Red-Green color difference signal $C_{RG}'$ that is generated using a nonlinear R signal of the nonlinear RGB signal and the nonlinear luminance signal, and a nonlinear Yellow-Blue color difference signal $C_{YB}'$ that is generated using a nonlinear B signal of the nonlinear RGB signal and the nonlinear luminance signal. The nonlinear color difference signal may also be generated by the video signal generation apparatus 900.

When the video signal generation apparatus 900 generates the nonlinear color difference signal using the nonlinear GB signal and the nonlinear luminance signal, the nonlinear signal generator 1220 may generate the nonlinear GB signal using the nonlinear color difference signal and the nonlinear luminance signal.

Also, when the video signal generation apparatus 900 generates the nonlinear color difference signal using the nonlinear RB signal and the nonlinear luminance signal, the nonlinear signal generator 1220 may generate the nonlinear RB signal using the nonlinear color difference signal and the nonlinear luminance signal.

The RGB signal converter 1230 may convert at least two nonlinear signals to at least two linear signals. For example, when the nonlinear signal generator 1220 generates the nonlinear GB signal, the RGB signal converter 1230 may convert the nonlinear GB signal to the linear GB signal. Also, when the nonlinear signal generator 1220 generates the nonlinear RB signal, the RGB signal converter 1230 may convert the nonlinear RB signal to the linear RB signal.

The linear RGB signal generator 1240 may generate a linear RGB signal using the linear luminance signal and the at least two linear signals. Specifically, the linear RGB signal generator 1240 may generate the linear RGB signal using the linear luminance signal that output of the luminance signal converter 1210, and using the at least two linear signals that are outputs of the RGB signal converter 1230. The generated linear RGB signal may be used to generate a result image corresponding to the input image of the video signal generation apparatus 900.

Figure 13:
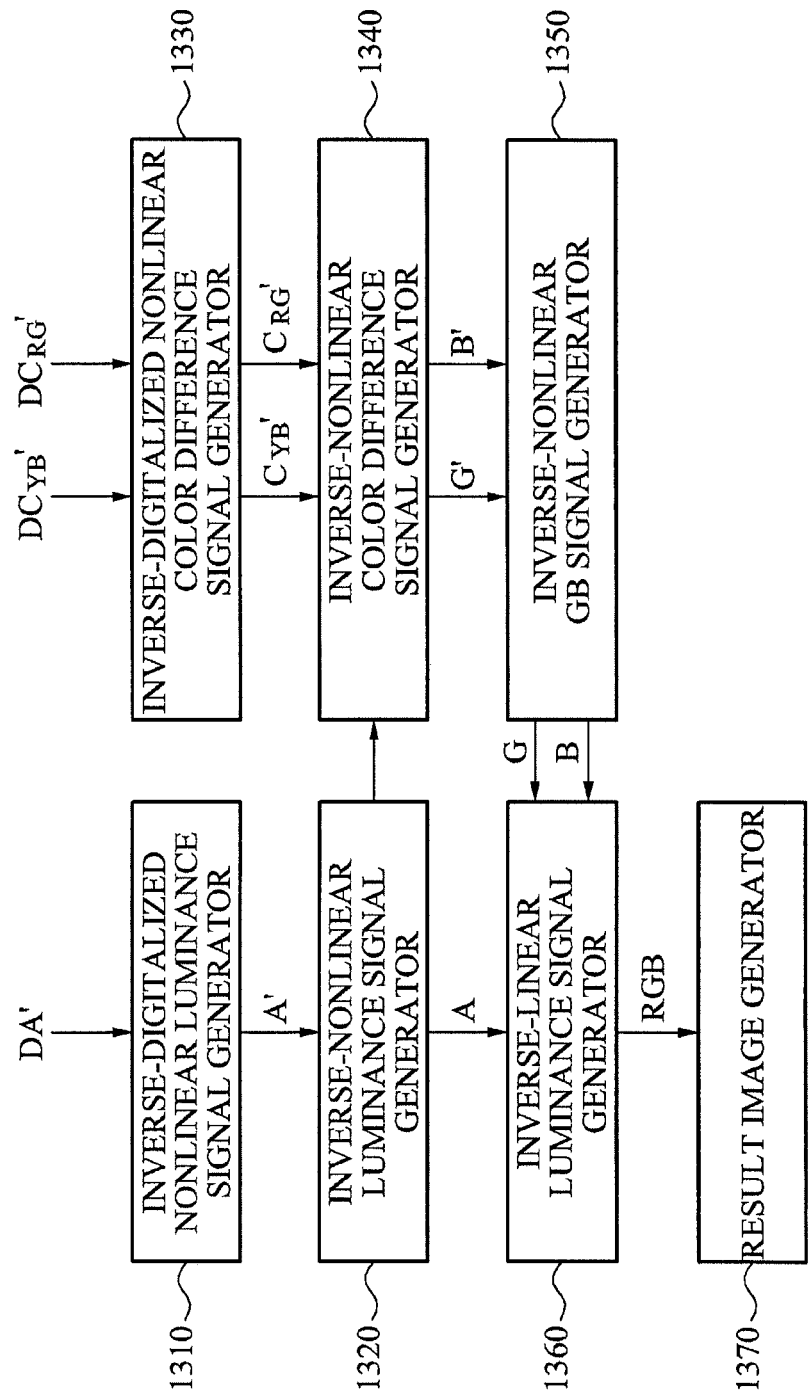
FIG. 13 illustrates a first example of generating a result image according to example embodiments.

FIG. 13 illustrates a first example of generating a result image according to example embodiments. FIG. 13 illustrates an inverse-digitalized nonlinear luminance signal generator 1310, an inverse-nonlinear luminance signal generator 1320, an inverse-digitalized nonlinear color difference signal generator 1330, an inverse-nonlinear color difference signal generator 1340, an inverse-nonlinear GB signal generator 1350, an inverse-linear luminance signal generator 1360, and a result image generator 1370.

In particular, the inverse-nonlinear luminance signal generator 1320 may correspond to the luminance signal converter 1210 of FIG. 12, the inverse-nonlinear color difference signal generator 1340 may correspond to the nonlinear signal generator 1220, the inverse-nonlinear GB signal generator 1350 may correspond to the RGB signal converter 1230, and the inverse-linear luminance signal generator 1360 may correspond to the linear RGB signal generator 1240.

As necessary, the inverse-digitalized nonlinear luminance signal generator 1310, the inverse-digitalized nonlinear color difference signal generator 1330, and the result image generator 1370 may be included in the video signal processing apparatus 1200, or may operate in a manner to transmit and receive data to and from the video signal processing apparatus 1200 outside the video signal processing apparatus 1200.

The inverse-digitalized nonlinear luminance signal generator 1310 may generate a nonlinear luminance signal A' by receiving and converting a digitalized nonlinear luminance signal DA'.

The inverse-nonlinear luminance signal generator 1320 may generate a linear luminance signal A by converting the nonlinear luminance signal A'.

The inverse-digitalized nonlinear color difference signal generator 1330 may generate nonlinear color difference signals, for example, $C_{YB}'$ and $C_{RG}'$ by receiving and inverse-digitalizing digitalized nonlinear color difference signals, for example, $DC_{YB}'$ and $DC_{RG}'$.

In this instance, the inverse-nonlinear color difference signal generator 1340 may generate a nonlinear GB signal (G', B') using the nonlinear color difference signals, for example, $C_{YB}'$ and $C_{RG}'$ and the nonlinear luminance signal A'.

The inverse-nonlinear GB signal generator 1350 may generate a linear GB signal (G, B) by converting the nonlinear GB signal (G', B').

The inverse-linear luminance signal generator 1360 may generate a linear RGB signal using the linear luminance signal A generated by the nonlinear luminance signal generator 1320, and using the linear GB signal generated by the inverse-nonlinear GB signal generator 1350.

The result image generator 1370 may generate a result image using the linear RGB signal.

Figure 14:
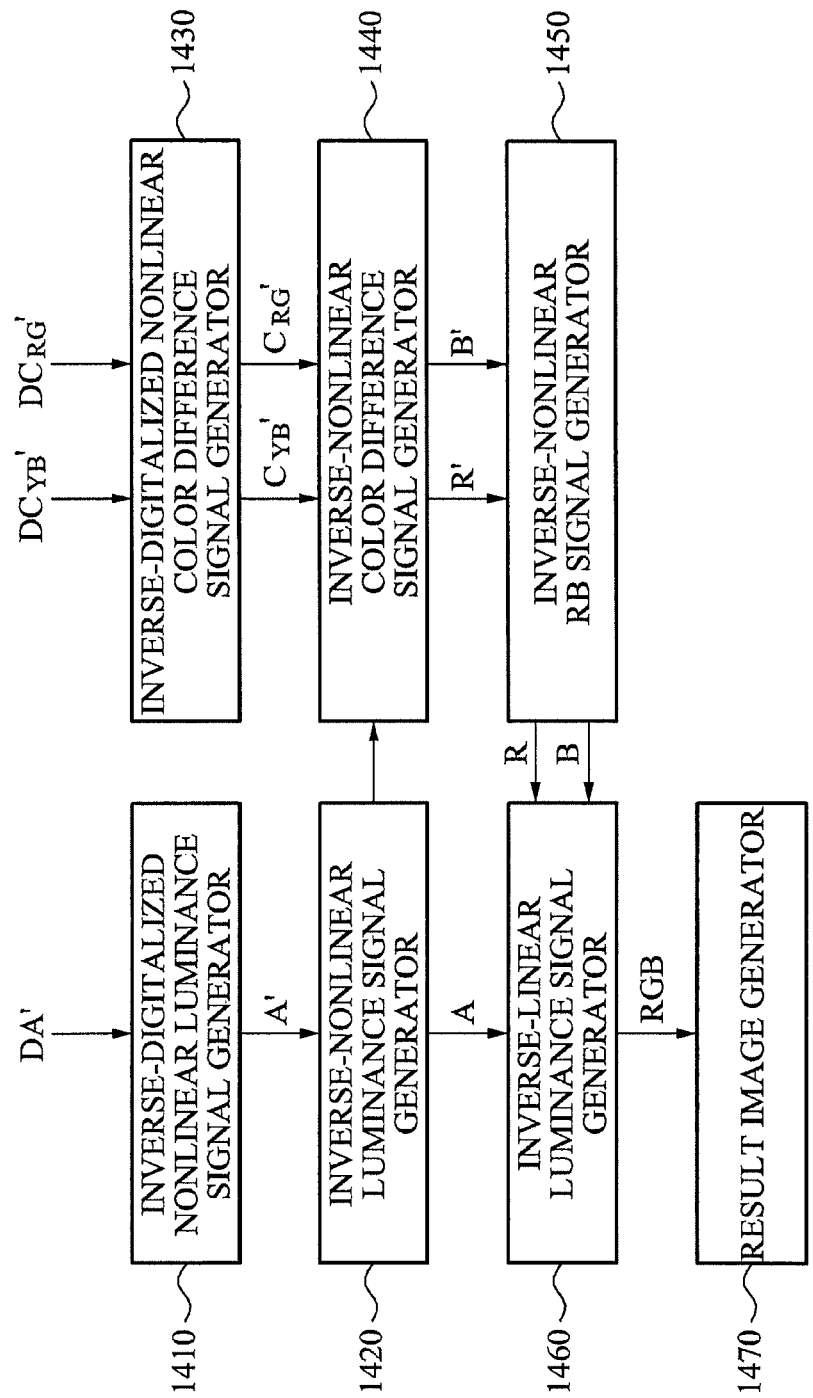
FIG. 14 illustrates a second example of generating a result image according to example embodiments.

FIG. 14 illustrates a second example of generating a result image according example embodiments. FIG. 14 illustrates an inverse-digitalized nonlinear luminance signal generator 1410, an inverse-nonlinear luminance signal generator 1420, an inverse-digitalized nonlinear color difference signal generator 1430, an inverse-nonlinear color difference signal generator 1440, an inverse-nonlinear RB signal generator 1450, an inverse-linear luminance signal generator 1460, and a result image generator 1470.

Here, the inverse-nonlinear luminance signal generator 1420 may correspond to the luminance signal converter 1210 of FIG. 12, the inverse-nonlinear color difference signal generator 1440 may correspond to the nonlinear signal generator 1220, the inverse-nonlinear RB signal generator 1450 may correspond to the RGB signal converter 1230, and the inverse-linear luminance signal generator 1460 may correspond to the linear RGB signal generator 1240.

As necessary, the inverse-digitalized nonlinear luminance signal generator 1410, the inverse-digitalized nonlinear color difference signal generator 1430, and the result image generator 1470 may be included in the video signal processing apparatus 1200, or may operate in a manner to transmit and receive data to and from the video signal processing apparatus 1200 outside the video signal processing apparatus 1200.

The inverse-digitalized nonlinear luminance signal generator 1410 may generate a nonlinear luminance signal A' by receiving and converting a digitalized nonlinear luminance signal DA'.

The inverse-nonlinear luminance signal generator 1420 may generate a linear luminance signal A by converting the nonlinear luminance signal A'.

The inverse-digitalized nonlinear color difference signal generator 1430 may generate nonlinear color difference signals, for example, $C_{YB}'$ and $C_{RG}'$ by receiving and inverse-digitalizing digitalized nonlinear color difference signals, for example, $DC_{YB}'$ and $DC_{RG}'$.

In this instance, the inverse-nonlinear color difference signal generator 1440 may generate a nonlinear RB signal (R', B') using the nonlinear color difference signals, for example, $C_{YB}'$ and $C_{RG}'$ and the nonlinear luminance signal A'.

The inverse-nonlinear RB signal generator 1450 may generate a linear RB signal (R, B) by converting the nonlinear RB signal (R', B').

The inverse-linear luminance signal generator 1460 may generate a linear RGB signal using the linear luminance signal A generated by the nonlinear luminance signal generator 1420, and using the linear RB signal generated by the inverse-nonlinear RB signal generator 1450.

The result image generator 1470 may generate a result image using the linear RGB signal.

The inverse-conversion process such as the inverse-digitalization, the inverse-nonlinearization, and the like, described above with reference to FIG. 12 through FIG. 14 may be performed by inversely applying Equation 3 through Equation 9.

FIG. 15 illustrates an example of sub-sampling performed in a video signal generation apparatus according to example embodiments. A color difference signal for a video signal and a luminance signal for a video signal may be used to perform sub-sampling of a color difference signal to decrease an information amount of image data. A first example 1510 indicates a 4:2:0 sub-sampling scheme. Specifically, color difference signals may be sub-sampled one by one on a 2×2 pixel unit. For example, a single color difference signal may be generated by averaging four pixel color difference signals, and thereby be used for sampling. A second example 1520 indicates a 4:1:0 sub-sampling scheme and a third example 1530 indicates a 16:1:0 sub-sampling scheme.

When the color difference signal includes a luminance signal component, luminance information may be distorted by sub-sampling of the color difference signal. Accordingly, when the image information is compressed, a quality of a result image may be deteriorated. However, according to example embodiments, luminance information of an original input image may be maintained by generating a linear luminance signal using a linear RGB signal having a proportional relationship with a brightness indicating a physical amount of luminance information. The quality of the result image may be enhanced by generating color difference information using a nonlinear RGB signal not having the proportional relationship with the brightness and a nonlinear luminance signal.

As an example of verifying information associated with the quality of the result image, RGB values of the result image obtained after sub-sampling of the original image and the color difference signal may be converted to CIE YZ values. Next, it is possible to calculate brightness values corresponding to XYZ values in corresponding pixels of the result image obtained after sub-sampling of the original image and the color difference signal through a CIELAB color appearance model. A representative brightness value with respect to each of the original image and the result image may be recalculated as a peak signal to noise ratio (PNSR)-brightness value using a PSNR equation given by Equation 10.

$$PSNR = 10\log_{10}\left(\frac{MAX_I^2}{MSE}\right)$$ [Equation 10]

$$MSE = \frac{1}{mn}\sum_{i=0}^{m-1}\sum_{j=0}^{n-1}[I(i,j) - K(i,j)]^2$$

Here, MSE denotes a mean squared error, m denotes a number of horizontal pixels of a corresponding image, n denotes a number of vertical pixels of the corresponding image, I(i, j) denotes a brightness value in each pixel location of the original image, K(i, j) denotes a brightness value in each pixel location of the result image, and MAX denotes a maximum brightness value of the original image. As the PSNR-brightness value increases, a brightness difference between the original image and the result image may relatively decrease. Conversely, as the PSNR-brightness value decreases, the brightness difference between the original image and the result image may relatively increase.

Figure 16:
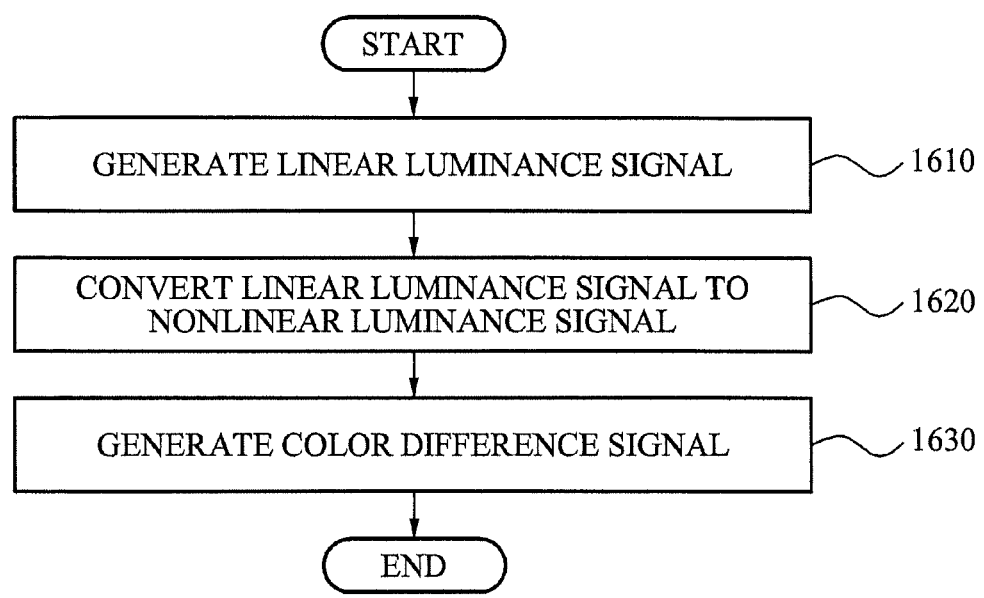
FIG. 16 illustrates a method of generating a video signal according to example embodiments.

FIG. 16 illustrates a method of generating a video signal according to example embodiments. The video signal generation method may be performed by the video signal generation apparatus 900 of FIG. 9. Hereinafter, the video signal generation method performed by the video signal generation apparatus 900 will be described with reference to FIG. 16. According to the video signal generation method, a linear luminance signal may be generated using a linear RGB signal. A video signal may be generated by converting the linear luminance signal to a nonlinear luminance signal and by quantizing the nonlinear luminance signal. Also, according to the video signal generation method, a color difference signal may be generated using the nonlinear luminance signal and at least two signals of the linear RGB signal.

In operation 1610, the video signal generation apparatus 900 may generate the linear luminance signal using the linear RGB signal with respect to an input image. In this instance, luminance information of an original input image may be maintained by generating a linear luminance signal using a linear RGB signal having a proportional relationship with a brightness indicating a physical amount of luminance information. For example, the video signal generation apparatus 900 may generate the linear luminance signal using a scheme expressed by Equation 3.

In operation 1620, the video signal generation apparatus 900 may convert the linear luminance signal to the nonlinear luminance signal. The video signal generation apparatus 900 may generate the linear luminance signal using the linear RGB signal, instead of generating the nonlinear luminance signal. The video signal generation apparatus 900 may convert the linear luminance signal to the nonlinear luminance signal and thereby use the converted nonlinear luminance signal as a video signal. As described above, by using the linear RGB signal to generate the luminance signal, luminance information of the original input image may be maintained. For example, the linear-luminance signal may be converted to the nonlinear luminance signal using a nonlinear function as expressed by Equation 4.

In operation 1630, the video signal generation apparatus 900 may generate a color difference signal using one luminance signal of the linear luminance signal and the nonlinear luminance signal, and at least two signals of the linear RGB signal and the nonlinear RGB signal. The video signal generation apparatus 900 may further perform an operation of converting the linear RGB signal to the nonlinear RGB signal.

For example, the video signal generation apparatus 900 may convert, to a nonlinear GB signal, a GB signal of the linear RGB signal, and may generate a nonlinear color difference signal using the converted nonlinear GB signal and the nonlinear luminance signal. For the above operation, the video signal generation apparatus 900 may convert, to the nonlinear GB signal, the GB signal of the linear RGB signal, and generate the nonlinear color difference signal using the nonlinear GB signal and the nonlinear luminance signal. In this case, the GB signal may be converted to the nonlinear GB signal using a nonlinear function as expressed by Equation 5.

Also, in operation 1630, the video signal generation apparatus 900 may generate a nonlinear Red-Green color difference signal $C_{RG}'$ using a nonlinear G signal and the nonlinear luminance signal, and may generate a nonlinear Yellow-Blue color difference signal $C_{YB}'$ using a nonlinear B signal and the nonlinear luminance signal. An example of generating the nonlinear Red-Green color difference signal $C_{RG}'$ and the nonlinear Yellow-Blue color difference signal $C_{YB}'$ may be expressed by Equation 6.

As another example, the video signal generation apparatus 900 may generate the color difference signal using an RB signal of the linear RGB signal and the nonlinear color difference signal. For the above operation, the video signal generation apparatus 900 may convert, to a nonlinear RB signal, the RB signal of the linear RGB signal, and may generate the nonlinear color difference signal using the nonlinear RB signal and the nonlinear luminance signal. The RB signal may be converted to the nonlinear RB signal using a nonlinear function as expressed by Equation 7.

Also, the video signal generation apparatus 900 may generate a nonlinear Red-Green color difference signal $C_{RG}'$ using a nonlinear R signal and the nonlinear luminance signal, and may generate a nonlinear Yellow-Blue color difference signal $C_{YB}'$ using a nonlinear B signal and the nonlinear luminance signal. An example of generating the nonlinear Red-Green color difference signal $C_{RG}'$ and the nonlinear Yellow-Blue color difference signal $C_{YB}'$ may be expressed by Equation 8.

The video signal generation apparatus 900 may perform sub-sampling of the color difference signal generated in operation 1630. Sub-sampling may be used to decrease an information amount in data of the input image. In the example embodiments, sub-sampling may be performed with respect to only the color difference signal. Sub-sampling is described above with reference to FIG. 15 and thus, further descriptions will be omitted here.

Figure 17:
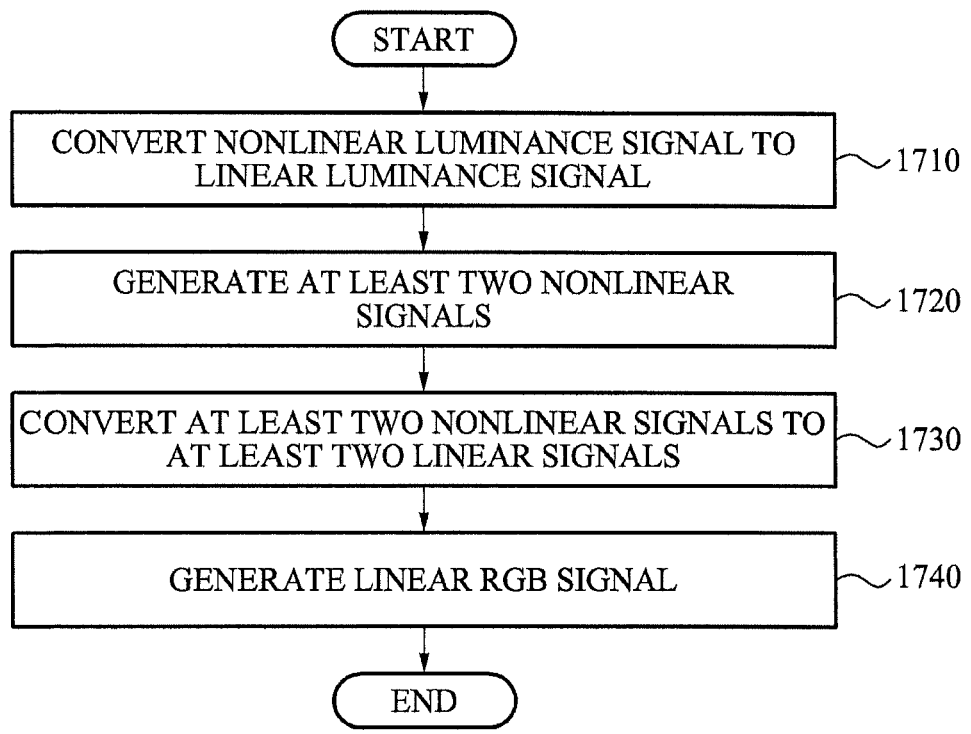
FIG. 17 illustrates a method of processing a video signal according to example embodiments.

FIG. 17 illustrates a method of processing a video signal according to example embodiments. The video signal processing method may be performed by the video signal processing apparatus 1200 of FIG. 12. Hereinafter, the video signal processing method performed by the video signal processing apparatus 1200 will be described with reference to FIG. 17.

In operation 1710, the video signal processing apparatus 1200 may convert a nonlinear luminance signal to a linear luminance signal. The nonlinear luminance signal may correspond to the nonlinear luminance signal described above with reference to FIG. 16. Specifically, the video signal processing apparatus 1200 may convert, to the linear luminance signal, the nonlinear luminance signal generated by the video signal generation method of FIG. 16.

In operation 1720, the video signal processing apparatus 1200 may generate at least two nonlinear signals from a nonlinear RGB signal using the nonlinear color difference signal. As one example, the nonlinear color difference signal may include a nonlinear Red-Green color difference signal $C_{RG}'$ that is generated using a nonlinear G signal of the nonlinear RGB signal and the nonlinear luminance signal, and a nonlinear Yellow-Blue color difference signal $C_{YB}'$ that is generated using a nonlinear B signal of the nonlinear RGB signal and the nonlinear luminance signal. As another example, the nonlinear color difference signal may include a nonlinear Red-Green color difference signal $C_{RG}'$ that is generated using a nonlinear R signal of the nonlinear RGB signal and the nonlinear luminance signal, and a nonlinear Yellow-Blue color difference signal $C_{YB}'$ that is generated using a nonlinear B signal of the nonlinear RGB signal and the nonlinear luminance signal. The nonlinear color difference signal may also be generated by the video signal generation method of FIG. 16.

When the video signal generation apparatus 900 generates the nonlinear color difference signal using the nonlinear GB signal and the nonlinear luminance signal, the video signal processing apparatus 1200 may generate the nonlinear GB signal using the nonlinear color difference signal and the nonlinear luminance signal.

Also, when the video signal generation apparatus 900 generates the nonlinear color difference signal using the nonlinear RB signal and the nonlinear luminance signal, the video signal processing apparatus 1200 may generate the nonlinear RB signal using the nonlinear color difference signal and the nonlinear luminance signal.

In operation 1730, the video signal processing apparatus 1200 may convert at least two nonlinear signals to at least two linear signals. For example, when the nonlinear GB signal is generated in operation 1720, the video signal processing apparatus 1200 may convert the nonlinear GB signal to the linear GB signal in operation 1730. Also, when the nonlinear RB signal is generated in operation 1720, the video signal processing apparatus 1200 may convert the nonlinear RB signal to the linear RB signal in operation 1730.

In operation 1740, the video signal processing apparatus 1200 may generate a linear RGB signal using the linear luminance signal and the at least two linear signals. Specifically, the video signal processing apparatus 1200 may generate the linear RGB signal using the linear luminance signal that is converted in operation 1710, and using the at least two linear signals that are converted in operation 1730. The generated linear RGB signal may be used to generate a result image corresponding to the input image of FIG. 16.

Descriptions not made above regarding FIG. 16 and FIG. 17 may refer to descriptions made above with reference to FIG. 9 through FIG. 15.

As described above, a video signal generation method according to example embodiments may generate a luminance signal and color difference signals maximizing a de-correlation characteristic between the luminance signal and the color difference signals, and a luminance difference between an original image and a result image may be minimized or barely exists as a result of sub-sampling of the color difference signals. Accordingly, the change in the color difference signals may barely affect the luminance signal and thereby crosstalk between the luminance signal and the color difference signals may be minimized. Also, luminance information of an original input image may be maintained by generating a linear luminance signal using a linear RGB signal having a proportional relationship with a brightness indicating a physical amount of luminance information. In addition, crosstalk between a luminance component and a color difference component may decrease. Also, when restoring compressed image information, it is possible to minimize a loss with respect to the original image.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it should be appreciated by those skilled in the art that changes may be made in these embodiments without departing from the principles and spirit of the disclosure, the scope of which is defined by the claims and their equivalents.

What is claimed is:

1. An apparatus generating a video signal, comprising:
   a luminance signal generator to generate a luminance signal A using one of a nonlinear Y signal and a sum of a nonlinear XYZ signal; and
   a color difference signal generator to generate a color difference signal from the nonlinear XYZ signal to maximize a de-correlation characteristic in combinations of the luminance signal A and a Yellow-Blue color difference signal $C_{YB}$, of the luminance signal A and a Red-Green color difference signal $C_{RG}$, and of the Yellow-Blue color difference signal $C_{YB}$ and the Red-Green color difference signal $C_{RG}$.

2. The apparatus of claim 1, wherein the color difference signal generator generates the Red-Green color difference signal $C_{RG}$ by separating an X signal and a Y signal from an XY signal pair and by separating an X signal and a Z signal from an XZ signal pair.

3. The apparatus of claim 1, wherein the color difference signal generator generates the Yellow-Blue color difference signal $C_{YB}$ by separating an X signal and a Z signal from an XZ signal pair and by separating an Y signal and a Z signal from a YZ signal pair.

4. The apparatus of claim 1, wherein the color difference signal generator generates the Red-Green color difference signal $C_{RG}$ from the nonlinear XYZ signal to maximize the de-correlation characteristic in the combinations of the luminance signal A and the Red-Green color difference signal $C_{RG}$ and of the Yellow-Blue color difference signal $C_{YB}$ and the Red-Green color difference signal $C_{RG}$, by forming a coefficient value given to a nonlinear X signal and a coefficient value given to a nonlinear Y(Z) signal having an opposite sign.

5. The apparatus of claim 1, wherein the color difference signal generator generates the Red-Green color difference signal $C_{RG}$ from the nonlinear XYZ signal when an absolute value of a coefficient given to a nonlinear Z signal is less than an absolute value of a coefficient given to a nonlinear X signal and a nonlinear Y signal.

6. The apparatus of claim 1, wherein the color difference signal generator generates the Yellow-Blue color difference signal $C_{YB}$ from the nonlinear XYZ signal to maximize the de-correlation characteristic in the combinations of the luminance signal A and the Yellow-Blue color difference signal $C_{YB}$ and of the Yellow-Blue color difference signal $C_{YB}$ and the Red-Green color difference signal $C_{RG}$, by forming a coefficient value given to a nonlinear Z signal and a coefficient value given to a nonlinear X(Y) signal having an opposite sign.

7. The apparatus of claim 1, wherein the color difference signal generator generates the Yellow-Blue color difference signal $C_{YB}$ from the nonlinear XYZ signal when an absolute value of a coefficient given to a nonlinear Z signal is greater than an absolute value of a coefficient given to a nonlinear X signal and a nonlinear Y signal.

8. The apparatus of claim 1, further comprising:
a correlation coefficient comparison unit to compare a reference value with a correlation coefficient between the luminance signal A and the Yellow-Blue color difference signal $C_{YB}$, a correlation coefficient between the luminance signal A and the Red-Green color difference signal $C_{RG}$, and a correlation coefficient between the Yellow-Blue color difference signal $C_{YB}$ and the Red-Green color difference signal $C_{RG}$; and
a result image generator to generate a result image after sub-sampling of a color difference signal having the correlation coefficient less than the reference value according to the comparison result.

9. The apparatus of claim 8, further comprising:
an analyzer to analyze a luminance difference between an original image and the result image; and
a luminance difference comparison unit to compare the luminance difference between the analyzed original image and the result image,
wherein, when one of the correlation coefficient is greater than or equal to the reference value and when the analyzed luminance difference does not approach a set value, the color difference signal generator generates the Yellow-Blue color difference signal $C_{YB}$ and the Red-Green color difference signal $C_{RG}$ from the nonlinear XYZ signal to minimize a correlation characteristic in the combinations of the luminance signal A and the Yellow-Blue color difference signal $C_{YB}$, of the luminance signal A and the Red-Green color difference signal $C_{RG}$, and of the Yellow-Blue color difference signal $C_{YB}$ and the Red-Green color difference signal $C_{RG}$.

10. The apparatus of claim 1, further comprising:
a color signal generator to generate tristimulus XYZ signals calculated from a color matching function reflecting sensitivity characteristics of human eyes responsive to a long wavelength, an intermediate wavelength, and a short wavelength; and
a nonlinear signal converter to convert the XYZ signals to the nonlinear XYZ signal using a nonlinear conversion function.

11. The apparatus of claim 1, wherein, in the case of an achromatic color, the color difference signal generator generates a color difference signal to have a color difference value of "0".

12. An apparatus generating a video signal, comprising:
a linear luminance signal generator to generate a linear luminance signal using linear RGB signals with respect to an input image;
a luminance signal converter to convert the linear luminance signal to a nonlinear luminance signal;
an RGB signal converter to convert the linear RGB signals to nonlinear RGB signals; and
a color difference signal generator to generate a color difference signal using one luminance signal from one of the linear luminance signal and the nonlinear luminance signal, and at least two signals from one of the linear RGB signals and the nonlinear RGB signals.

13. The apparatus of claim 12, wherein the color difference signal generator comprises:
a GB signal converter to convert GB signals in the linear RGB signals to nonlinear GB signals; and
a nonlinear color difference signal generator to generate a nonlinear color difference signal using the nonlinear GB signals and the nonlinear luminance signal.

14. The apparatus of claim 13, wherein the nonlinear color difference signal generator generates a nonlinear Red-Green color difference signal $C_{RG}'$ using a nonlinear G signal and the nonlinear luminance signal, and generates a nonlinear Yellow-Blue color difference signal $C_{YB}'$ using a nonlinear B signal and the nonlinear luminance signal.

15. The apparatus of claim 12, wherein the color difference signal generator comprises:
an RB signal converter to convert RB signals in the linear RGB signals to nonlinear RB signals; and
a nonlinear color difference signal generator to generate a nonlinear color difference signal using the nonlinear RB signals and the nonlinear luminance signal.

16. The apparatus of claim 15, wherein the nonlinear color difference signal generator generates a nonlinear Red-Green color difference signal $C_{RG}'$ using a nonlinear R signal and the nonlinear luminance signal, and generates a nonlinear Yellow-Blue color difference signal $C_{YB}'$ using a nonlinear B signal and the nonlinear luminance signal.

17. The apparatus of claim 12, further comprising:
a sub-sampling unit to perform sub-sampling of the color difference signal.

18. An apparatus processing a video signal, comprising:
a luminance signal converter to convert a nonlinear luminance signal to a linear luminance signal;
a nonlinear signal generator to generate at least two nonlinear signals in nonlinear RGB signals using a nonlinear color difference signal;
an RGB signal converter to convert the at least two nonlinear signals in the nonlinear RGB signals to at least two linear signals in linear RGB signals; and
a linear RGB signal generator to generate a complete set of linear RGB signals using the linear luminance signal and the at least two linear signals in the linear RGB signals.

19. The apparatus of claim 18, wherein the nonlinear color difference signal comprises a nonlinear Red-Green color difference signal $C_{RG}'$ that is generated using a nonlinear G signal in the nonlinear RGB signals and the nonlinear luminance signal, and a nonlinear Yellow-Blue color difference signal $C_{YB}'$ that is generated using a nonlinear B signal in the nonlinear RGB signals and the nonlinear luminance signal.

20. The apparatus of claim 18, wherein the nonlinear color difference signal comprises a nonlinear Red-Green color difference signal $C_{RG}$' that is generated using a nonlinear R signal in the nonlinear RGB signals and the nonlinear luminance signal, and a nonlinear Yellow-Blue color difference signal $C_{YB}$' that is generated using a nonlinear B signal in the nonlinear RGB signals and the nonlinear luminance signal.

21. A method of generating a video signal, comprising:
generating, by at least one processing device, a luminance signal A using one of a nonlinear Y signal and a sum of a nonlinear XYZ signal; and
generating, by the at least one processing device, a color difference signal from the nonlinear XYZ signal to maximize a de-correlation characteristic in combinations of the luminance signal A and a Yellow-Blue color difference signal $C_{YB}$, of the luminance signal A and a Red-Green color difference signal $C_{RG}$, and of the Yellow-Blue color difference signal $C_{YB}$ and the Red-Green color difference signal $C_{RG}$.

22. The method of claim 21, wherein the generating of the color difference signal comprises generating the Red-Green color difference signal $C_{RG}$ by separating an X signal and a Y signal from an XY signal pair and by separating an X signal and a Z signal from an XZ signal pair.

23. The method of claim 21, wherein the generating of the color difference signal comprises generating the Yellow-Blue color difference signal $C_{YB}$ by separating an X signal and a Z signal from an XZ signal pair and by separating a Y signal and a Z signal from a YZ signal pair.

24. The method of claim 21, wherein the generating of the color difference signal comprises generating the Red-Green color difference signal $C_{RG}$ from the nonlinear XYZ signal to maximize the de-correlation characteristic in the combinations of the luminance signal A and the Red-Green color difference signal $C_{RG}$ and of the Yellow-Blue color difference signal $C_{YB}$ and the Red-Green color difference signal $C_{RG}$, by forming a coefficient value given to a nonlinear X signal and a coefficient value given to a nonlinear Y(Z) signal having an opposite sign.

25. The method of claim 21, wherein the generating of the color difference signal comprises generating the Red-Green color difference signal $C_{RG}$ from the nonlinear XYZ signal when an absolute value of a coefficient given to a nonlinear Z signal is less than an absolute value of a coefficient given to a nonlinear X signal and a nonlinear Y signal.

26. The method of claim 21, wherein the generating of the color difference signal comprises generating the Yellow-Blue color difference signal $C_{YB}$ from the nonlinear XYZ signal to maximize the de-correlation characteristic in the combinations of the luminance signal A and the Yellow-Blue color difference signal $C_{YB}$ and of the Yellow-Blue color difference signal $C_{YB}$ and the Red-Green color difference signal $C_{RG}$, by forming a coefficient value given to a nonlinear Z signal and a coefficient value given to a nonlinear X(Y) signal having an opposite sign.

27. The method of claim 21, wherein the generating of the color difference signal comprises generating the Yellow-Blue color difference signal $C_{YB}$ from the nonlinear XYZ signal when an absolute value of a coefficient given to a nonlinear Z signal is greater than an absolute value of a coefficient given to a nonlinear X signal and a nonlinear Y signal.

28. The method of claim 21, further comprising:
comparing a reference value with a correlation coefficient between the luminance signal A and the Yellow-Blue color difference signal $C_{YB}$, a correlation coefficient between the luminance signal A and the Red-Green color difference signal $C_{RG}$, and a correlation coefficient between the Yellow-Blue color difference signal $C_{YB}$ and the Red-Green color difference signal $C_{RG}$; and
generating a result image after sub-sampling of a color difference signal, where the correlation coefficient is less than the reference value according to the comparison result.

29. The method of claim 28, further comprising:
analyzing a luminance difference between an original image and the result image; and
comparing the luminance difference between the analyzed original image and the result image,
wherein, when one of the correlation coefficient is greater than or equal to the reference value and when the analyzed luminance difference does not approach a set value, the generating of the color difference signal includes generating the Yellow-Blue color difference signal $C_{YB}$ and the Red-Green color difference signal $C_{RG}$ from the nonlinear XYZ signal to minimize a correlation characteristic in the combinations of the luminance signal A and the Yellow-Blue color difference signal $C_{YB}$, of the luminance signal A and the Red-Green color difference signal $C_{RG}$, and of the Yellow-Blue color difference signal $C_{YB}$ and the Red-Green color difference signal $C_{RG}$.

30. The method of claim 21, further comprising:
generating tristimulus XYZ signals calculated from a color matching function reflecting sensitivity characteristics of human eyes responsive to a long wavelength, an intermediate wavelength, and a short wavelength; and
converting the XYZ signals to the nonlinear XYZ signal using a nonlinear conversion function.

31. The method of claim 21, wherein, in the case of an achromatic color, the generating of the color difference signal comprises generating a color difference signal to have a color difference value of "0".

32. A method of generating a video signal, comprising:
generating, by at least one processing device, a linear luminance signal using linear RGB signals with respect to an input image;
converting, by the at least one processing device, the linear luminance signal to a nonlinear luminance signal;
converting, by the at least one processing device, the linear RGB signals to nonlinear RGB signals; and
generating, by the at least one processing device, a color difference signal using one luminance signal from one of the linear luminance signal and the nonlinear luminance signal, and at least two signals from one of the linear RGB signals and the nonlinear RGB signals.

33. A method of processing a video signal, comprising:
converting, by at least one processing device, a nonlinear luminance signal to a linear luminance signal;
generating, by the at least one processing device, at least two nonlinear signals in nonlinear RGB signals using a nonlinear color difference signal;
converting, by the at least one processing device, the at least two nonlinear signals in the nonlinear RGB signals to at least two linear signals in linear RGB signals; and
generating, by the at least one processing device, the linear RGB signals using the linear luminance signal and the at least two linear signals in the linear RGB signals.

34. At least one non-transitory computer-readable medium comprising computer readable instructions that control at least one processing device to implement the method of claim 21.

* * * * *